United States Patent
Wagner et al.

(10) Patent No.: US 10,794,277 B2
(45) Date of Patent: Oct. 6, 2020

(54) THERMAL STORAGE SYSTEM CHARGING

(71) Applicant: Aestus Energy Storage, LLC, Pittsford, NY (US)

(72) Inventors: Thomas Wagner, Troy, NY (US); Ercan Dumlupinar, Boston, MA (US)

(73) Assignee: Aestus Energy Storage, LLC, Pittsford, NY (US)

( * ) Notice: Subject to any disclaimer, the term of this patent is extended or adjusted under 35 U.S.C. 154(b) by 0 days.

(21) Appl. No.: 16/197,757

(22) Filed: Nov. 21, 2018

(65) Prior Publication Data

US 2019/0093556 A1 Mar. 28, 2019

Related U.S. Application Data

(60) Provisional application No. 62/588,991, filed on Nov. 21, 2017.

(51) Int. Cl.
*F02C 6/14* (2006.01)
*F02C 1/05* (2006.01)
*F02C 1/10* (2006.01)

(52) U.S. Cl.
CPC .............. *F02C 6/14* (2013.01); *F02C 1/05* (2013.01); *F02C 1/10* (2013.01); *F05D 2260/211* (2013.01); *F05D 2300/5023* (2013.01)

(58) Field of Classification Search
CPC ........ F02C 6/14; F02C 1/05; F05D 2260/211; F01D 1/02; F01K 5/00
See application file for complete search history.

(56) References Cited

U.S. PATENT DOCUMENTS

| | | | |
|---|---|---|---|
| 3,716,990 A * | 2/1973 | Davoud ................ | F01K 19/04 60/677 |
| 9,932,830 B2 | 4/2018 | Laughlin | |
| 10,012,448 B2 | 7/2018 | Laughlin et al. | |
| 10,094,219 B2 | 10/2018 | Laughlin | |
| 2010/0251711 A1* | 10/2010 | Howes ................ | F01K 3/12 60/659 |
| 2011/0204655 A1* | 8/2011 | Waibel ................ | F25B 6/04 290/1 R |
| 2011/0259007 A1* | 10/2011 | Aoyama ................ | F02C 1/05 60/641.14 |
| 2012/0036860 A1* | 2/2012 | Wettstein ................ | F02C 1/08 60/772 |

(Continued)

OTHER PUBLICATIONS

International Search Report and Written Opinion dated Feb. 6, 2019 of counterpart International Application No. PCT/US2018/062232.

*Primary Examiner* — Shafiq Mian
(74) *Attorney, Agent, or Firm* — DLA Piper LLP (US)

(57) ABSTRACT

An energy storage system is disclosed. The energy storage system includes a turbo train drive, a hot heat sink, and a reservoir. The turbo train drive is in mechanical communication with a compressor and an expander. The hot heat sink is in thermal communication between an output of the compressor and an input of the expander. The reservoir is in thermal communication between an output of the expander and an input of the compressor. The compressor and the expander, via the turbo train drive, are operable between a charging function for charging the hot heat sink and a discharging function for discharging the hot heat sink.

26 Claims, 27 Drawing Sheets

(56) References Cited

U.S. PATENT DOCUMENTS

| | | | |
|---|---|---|---|
| 2013/0160449 A1* | 6/2013 | Cogswell | F01K 23/04 |
| | | | 60/653 |
| 2014/0060051 A1* | 3/2014 | Ohler | F01K 3/12 |
| | | | 60/652 |
| 2015/0292349 A1* | 10/2015 | Mariotti | F01D 17/16 |
| | | | 415/1 |
| 2016/0298455 A1* | 10/2016 | Laughlin | F01K 5/00 |
| 2016/0298495 A1 | 10/2016 | Laughlin | |
| 2017/0159495 A1 | 6/2017 | Laughlin et al. | |
| 2017/0159496 A1 | 6/2017 | Laughlin et al. | |
| 2017/0159497 A1 | 6/2017 | Laughlin et al. | |
| 2017/0159498 A1 | 6/2017 | Laughlin et al. | |
| 2017/0159500 A1 | 6/2017 | Laughlin et al. | |
| 2018/0187627 A1* | 7/2018 | Apte | F02C 1/05 |

\* cited by examiner

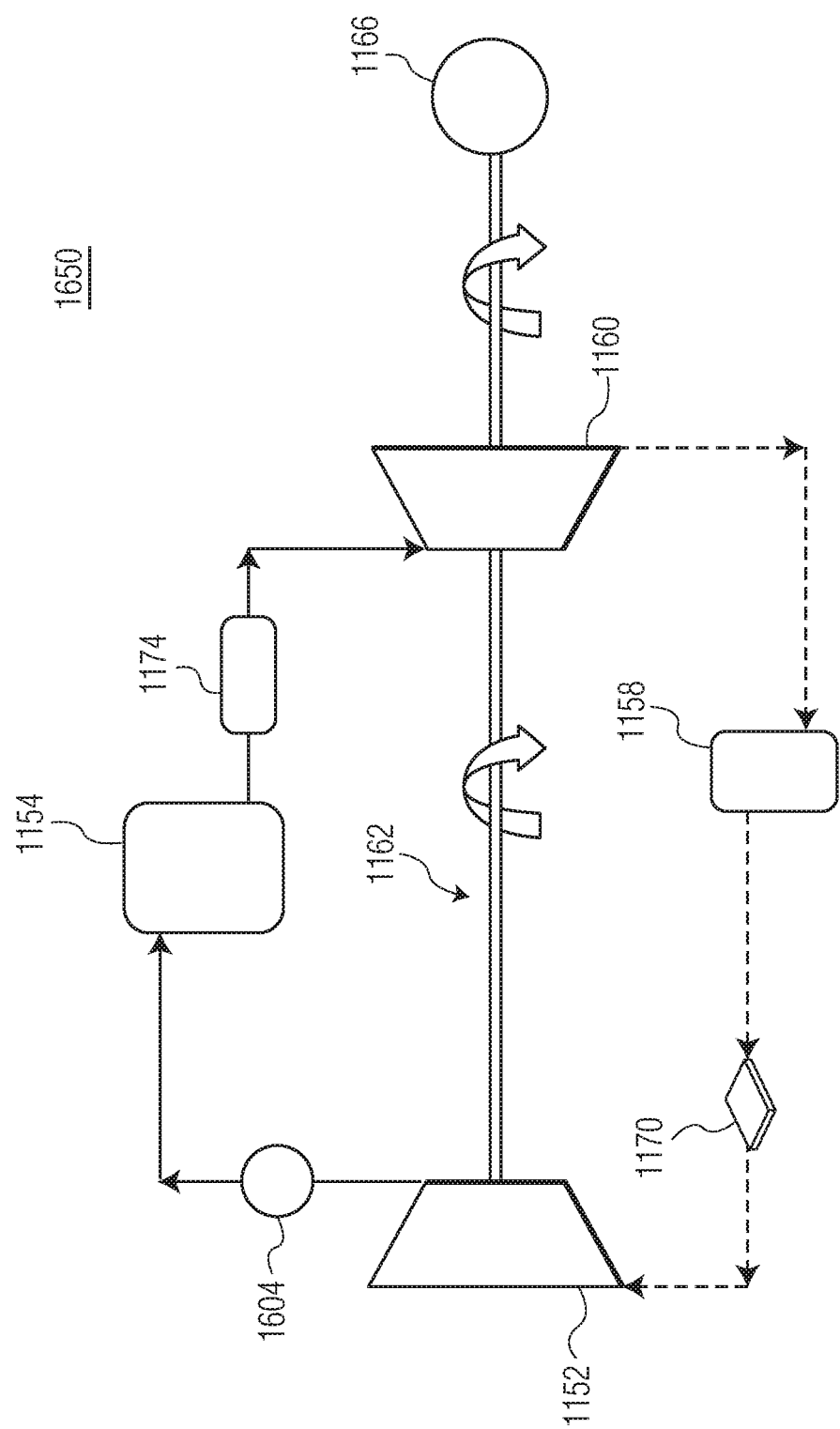

THERMAL STORAGE SYSTEM CHARGING

TECHNICAL FIELD

The present disclosure generally relates to power generation systems, and more particularly to an improved thermal energy storage system and methods for charging/discharging of the thermal energy storage system.

BACKGROUND

Energy storage has entered piloted qualification use in the power generation industry. This technology is drawing the attention of key analysts, such as those at Bloomberg, McKinsey, and Green Tech Media, and is being reported as the next disruptive technology for power generation. For example, over 20 states (e.g., California, Illinois, Hawaii, Texas, Ohio, New York, Oregon, Massachusetts, and Utah) are currently offering incentives to generation providers to pilot battery storage, as a means to smooth renewable energy generation periods, regulate grid frequency, and defer transmission and distribution upgrades. Furthermore, there has been a significant cost reduction in battery storage from roughly $1000/kW in 2010 to about $230/kW in 2016.

Additionally, the current state of technology is enabling the development of behind the meter applications. Key analysts in the field have predicted even further cost decrease of battery storage, at a rate of about 10% per year, and a total service generation of about 1 GW by 2018. A portion of the increase may be behind meter and distributed applications in support of grid upgrade deferral. There is a need for systems and methods that can aid in reducing demand charges, replace conventional back-up power, and also, store on site renewable generated power.

SUMMARY

In one embodiment, an energy storage system is disclosed herein. The energy storage system includes a turbo train drive, a hot heat sink, and a reservoir. The turbo train drive is in mechanical communication with a compressor and an expander. The hot heat sink is in thermal communication between an output of the compressor and an input of the expander. The reservoir is in thermal communication between an output of the expander and an input of the compressor. The compressor and the expander, via the turbo train drive, are operable between a charging function for charging the hot heat sink while discharging the reservoir and a discharging function for discharging the hot heat sink. In some embodiments, the hot heat sink is discharged while charging the reservoir.

In another embodiment, an energy storage system is disclosed herein. The energy storage system includes a turbo train drive, a hot heat sink, and a recuperator. The turbo train drive is in mechanical communication with a compressor and an expander. The hot heat sink is in thermal communication between an output of the compressor and an input of the expander. The recuperator is in thermal communication between an output of the expander and an input of the compressor. The compressor and the expander, via the turbo train drive, are operable between a charging function for charging the hot heat sink and a discharging function for discharging the hot heat sink.

In another embodiment, an energy storage system is disclosed herein. The energy storage system includes a turbo train drive, a hot heat sink, a bottoming cycle, and a heat booster. The turbo train drive is in mechanical communication with a compressor and an expander. The hot heat sink is in thermal communication between an output of the compressor and an input of the expander. The bottoming cycle is in thermal communication between an output of the hot heat sink and the input of the expander. The heat booster is in thermal communication between an output of the expander and an input of the compressor. The compressor and the expander, via the turbo train drive, are operable between a charging function for charging the hot heat sink and a discharging function for discharging the hot heat sink.

BRIEF DESCRIPTION OF THE DRAWINGS

So that the manner in which the above recited features of the present disclosure can be understood in detail, a more particular description of the disclosure may be had by reference to one or more examples, some of which are illustrated in the appended drawings. The appended drawings illustrate examples of this disclosure and are therefore not to be considered limiting of its scope.

FIG. 16 illustrates a schematic of an example TESS, according to another embodiment.

DETAILED DESCRIPTION

The present disclosure is directed to an improved thermal energy storage system (TESS) and improved methods for charging and discharging the TESS. The TESS uses a high efficiency gas turbine compression and expansion mechanism to drive a generator using a heat store (also referred to herein as a heat sink). The TESS improves the working cycle points of the system to achieve a more cost effective system configuration based on overall efficiency points. For example, the TESS of the present disclosure may use a compressor-expander-motor process to heat a working fluid, circulate the working fluid within the closed loop (e.g., a closed loop Brayton cycle) system, and store heat in the heat store for later discharge or generation of power. This process may also apply waste heat stored during a discharge cycle to improve the efficiency of the thermal energy storage system, thereby minimizing an amount of heat needed to produce a kilowatt hour (kWh) of dispatched power.

Figure 1A:
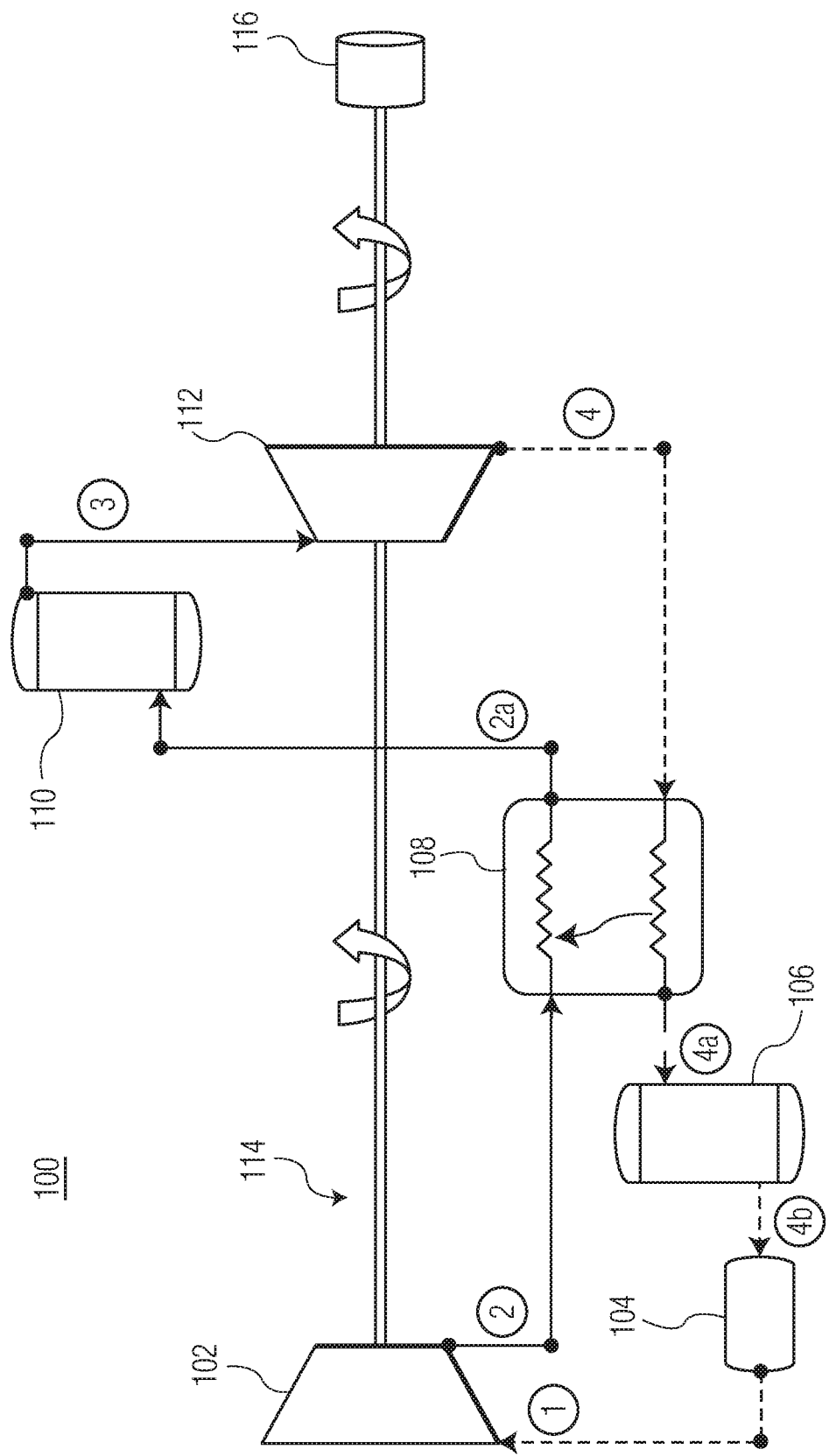
FIG. 1A illustrates a schematic of an example thermal energy storage system (TESS), according to one embodiment.
Figure 1B:
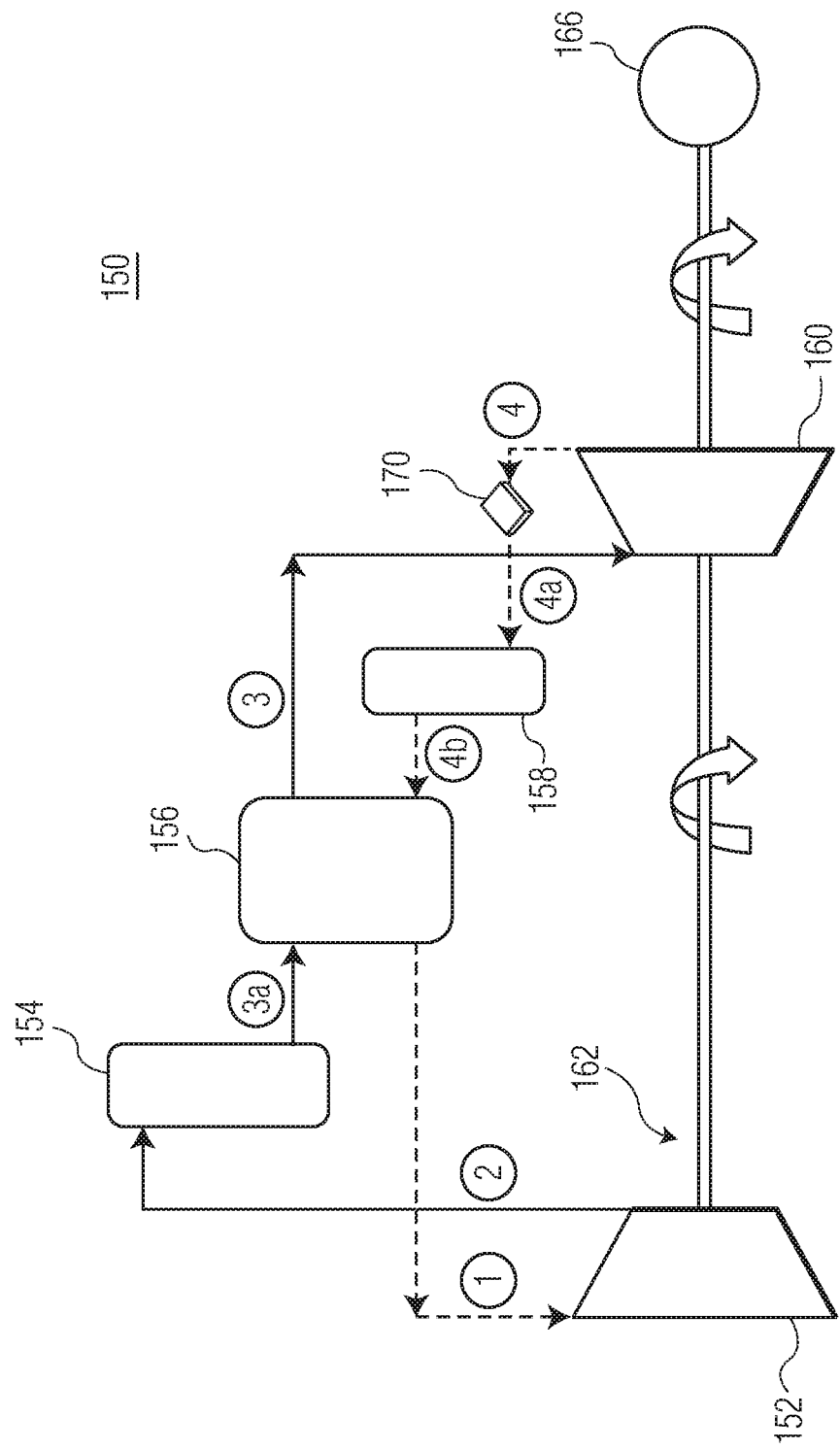
FIG. 1B illustrates a schematic of an example thermal energy storage system (TESS), according to another embodiment.
Figure 7A:
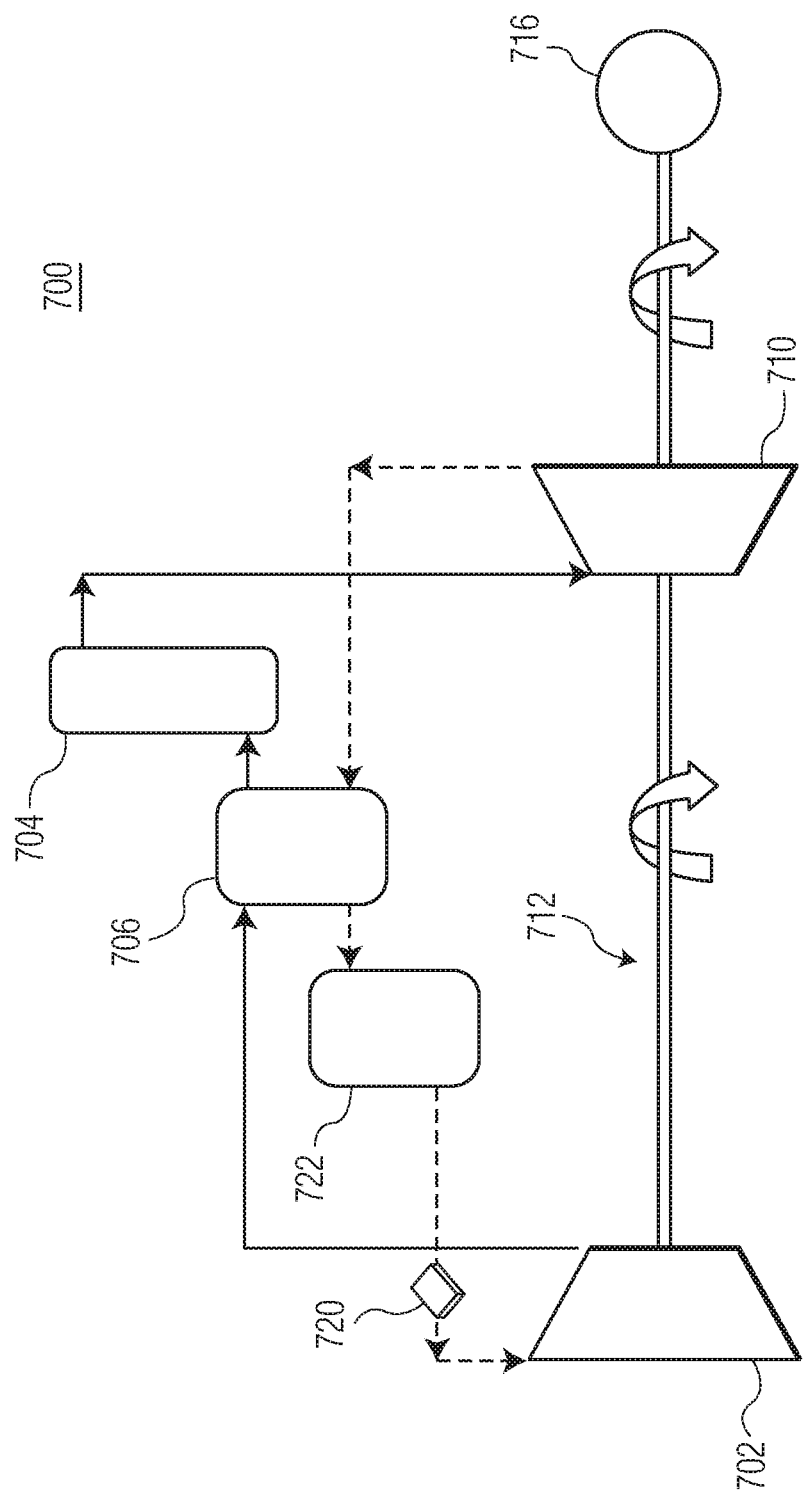
FIG. 7A illustrates a schematic of an example TESS, according to another embodiment.
Figure 7B:
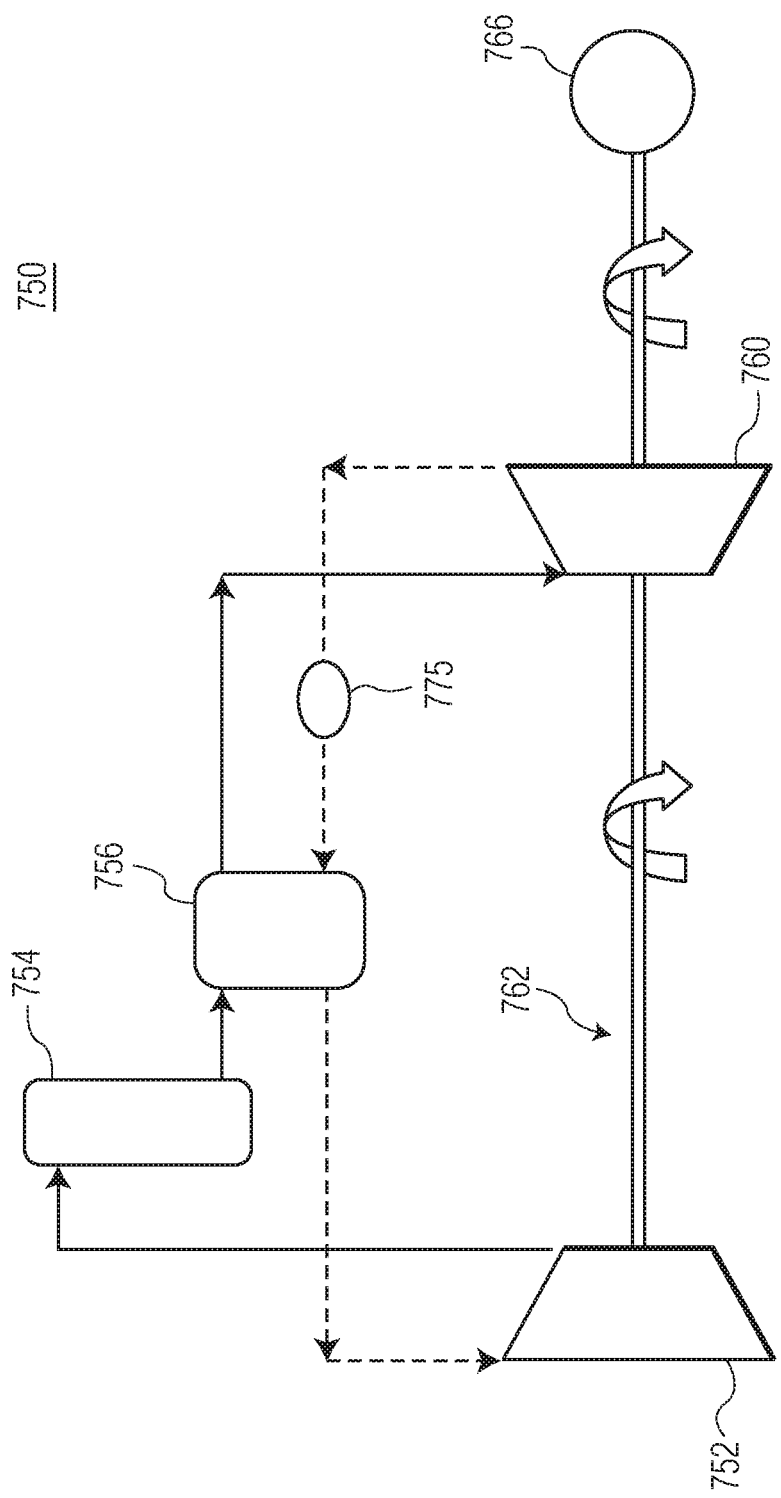
FIG. 7B illustrates a schematic of an example TESS, according to another embodiment.
Figure 11A:
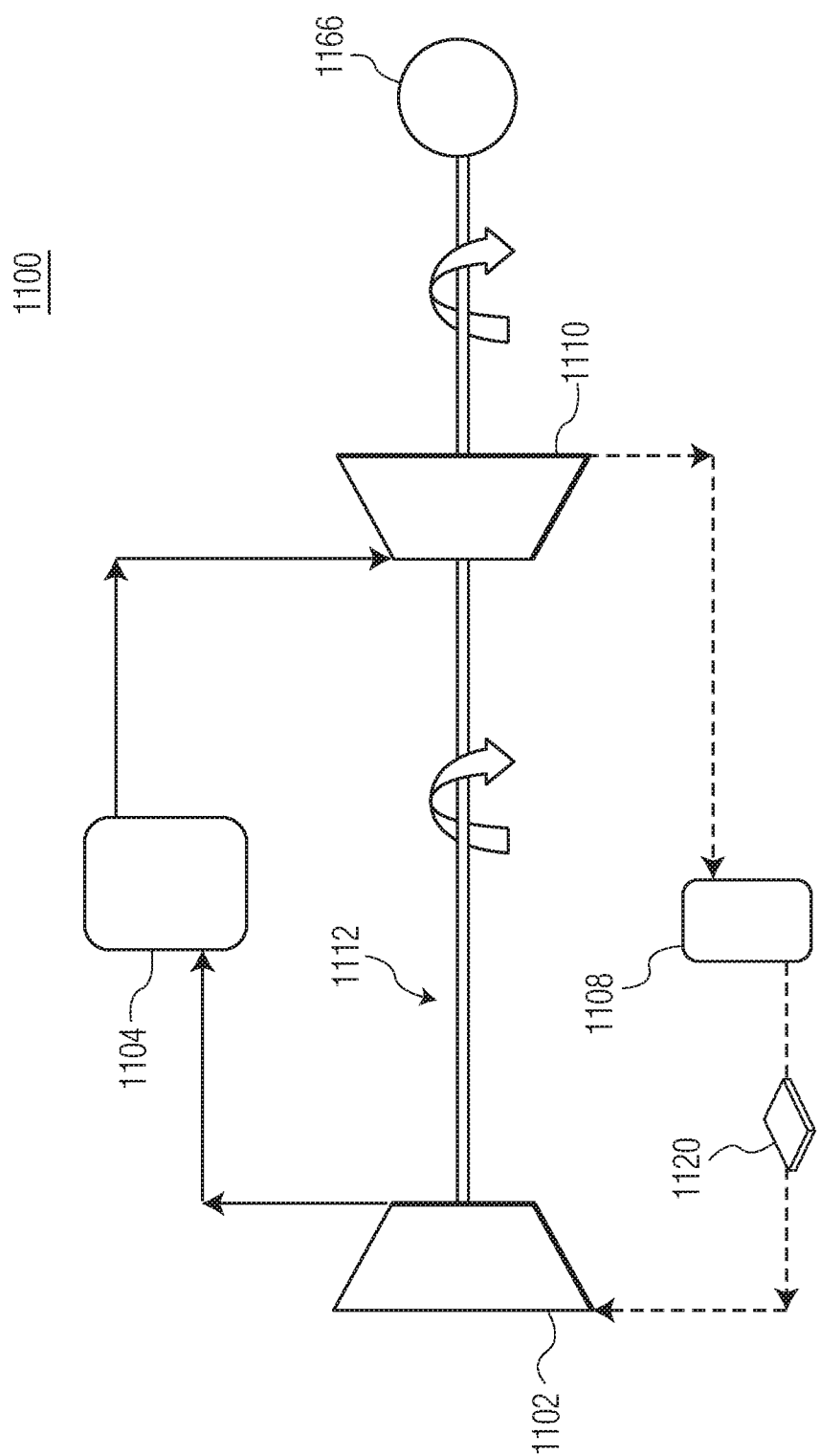
FIG. 11A illustrates a schematic of an example TESS, according to another embodiment.
Figure 11B:
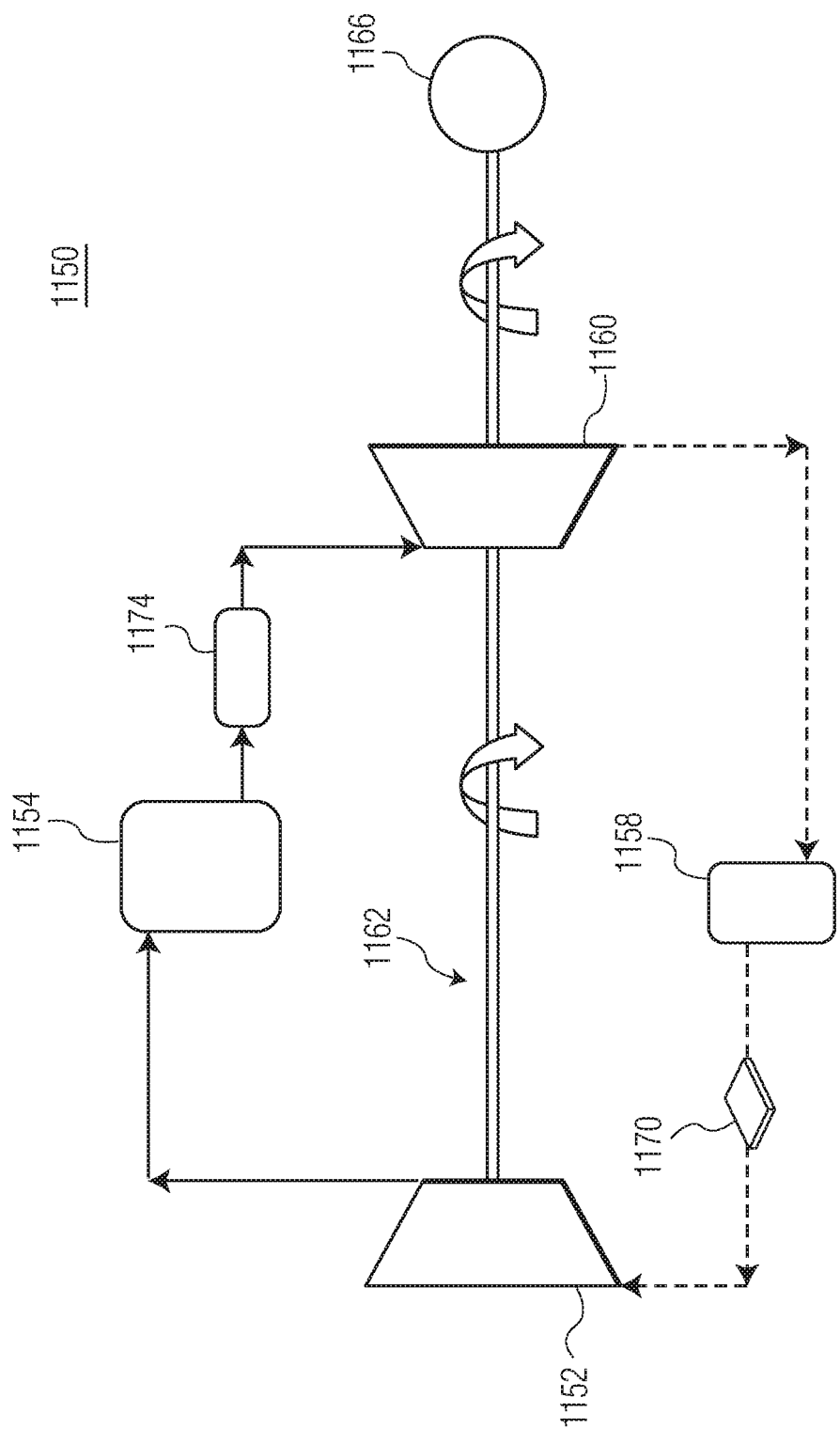
FIG. 11B illustrates a schematic of an example TESS, according to another embodiment.
Figure 17A:
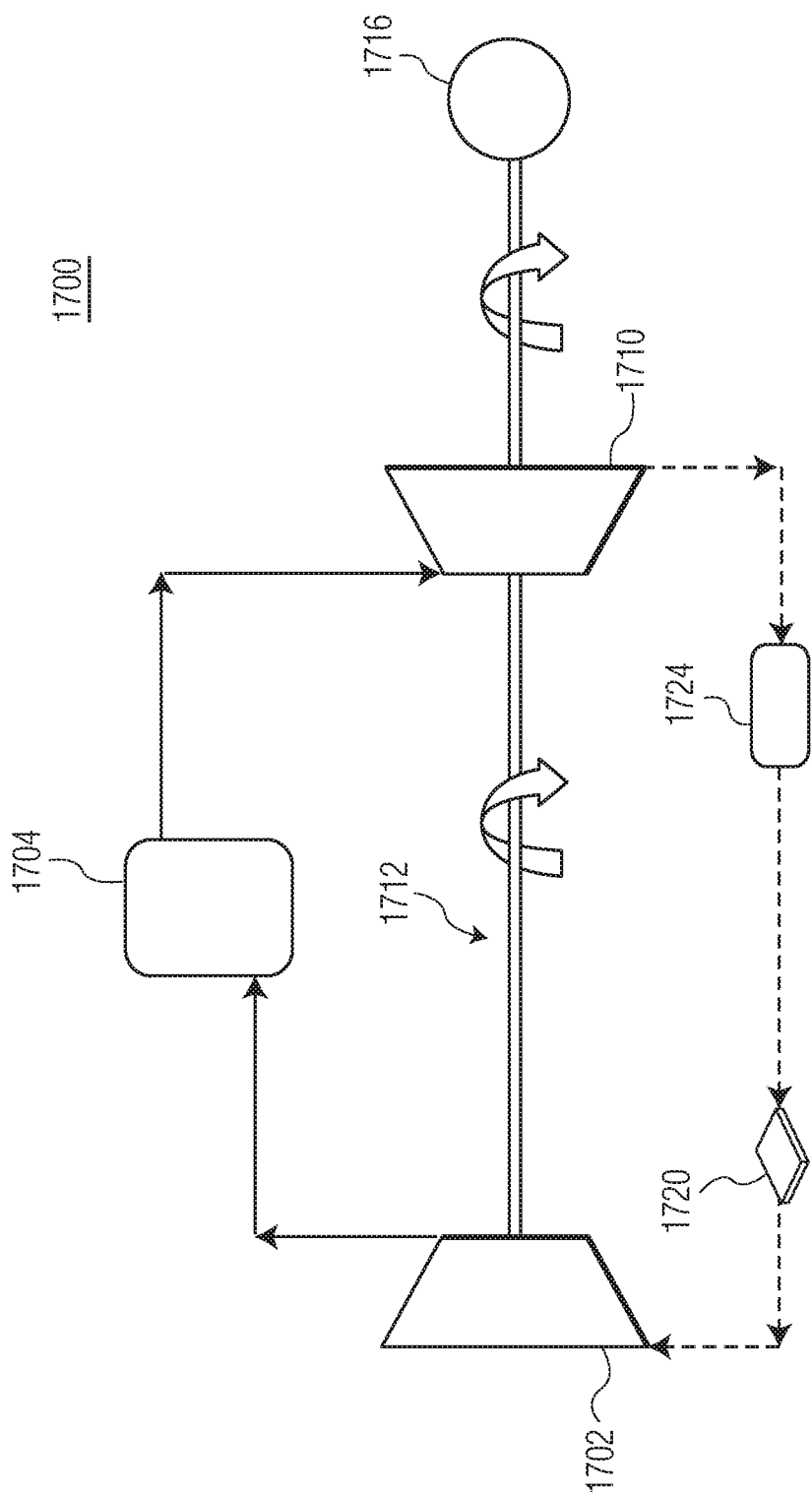
FIG. 17A illustrates a schematic of an example TESS, according to another embodiment.
Figure 17B:
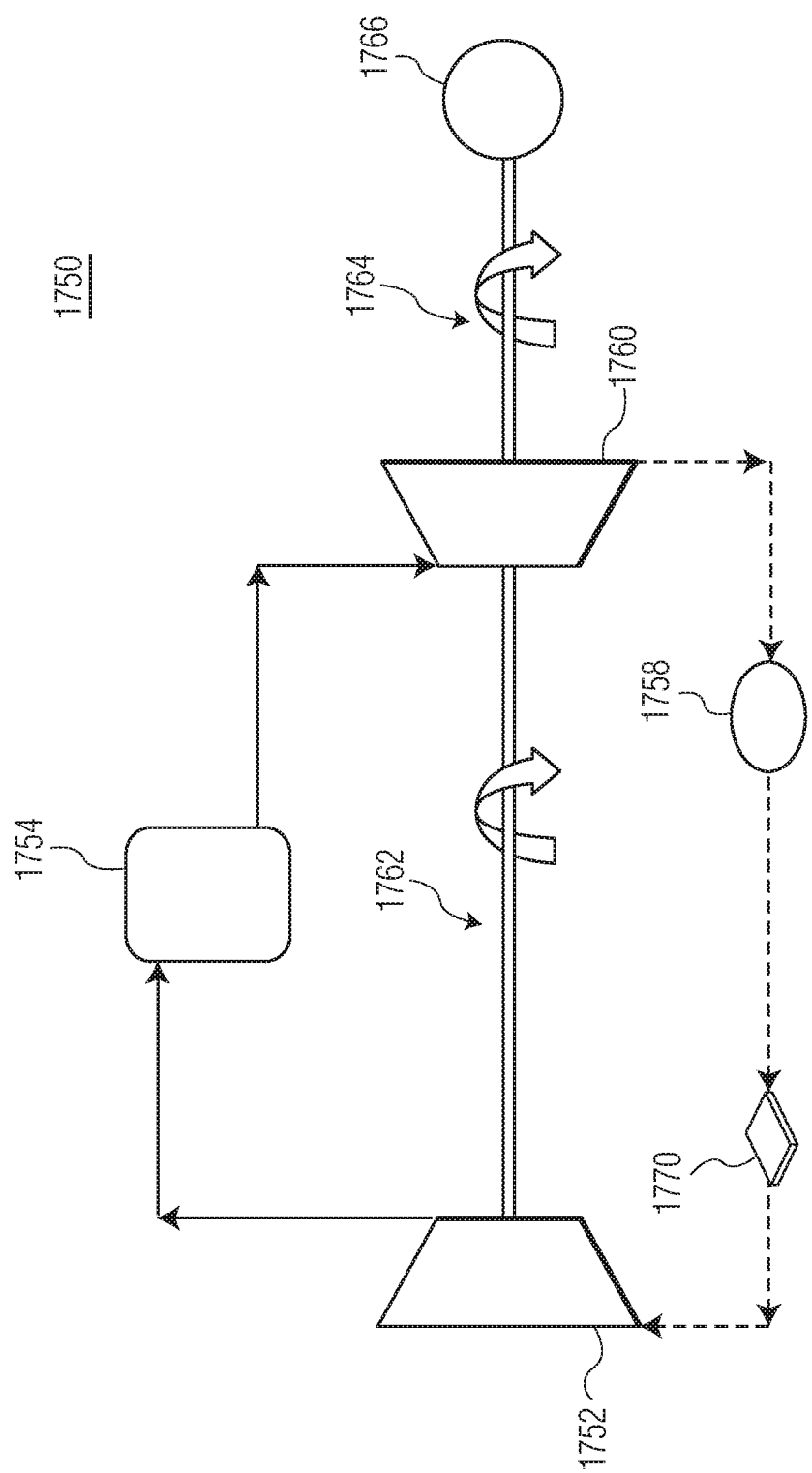
FIG. 17B illustrates a schematic of an example TESS, according to another embodiment.

Although components of TESS 100 in FIG. 1A and TESS 150 in FIG. 1B, TESS 700 in FIG. 7A and TESS 750 in FIG. 7B, TESS 1100 in FIG. 11A and TESS 1150 in FIG. 11B, and TESS 1700 in FIG. 17A and TESS 1750 in FIG. 17B are described with unique reference numerals, those skilled in the art may readily understand TESS 100 and TESS 150, TESS 700 and TESS 750, TESS 1100 and TESS 1150, and TESS 1700 and TESS 1750 may share one or more components.

Further, although temperature ranges, pressure ranges, and round-trip efficiency ratings may be discussed with respect to a certain Figure, those skilled in the art may readily understand that such temperature ranges, pressure ranges, and round-trip efficiency may be applicable to all systems described herein, unless explicitly stated otherwise.

Still further, with respect to FIGS. 1-18, the solid lines may represent a higher temperature/higher pressure path through the system, while the dashed lines may represent a lower temperature/lower pressure path through the system.

In one embodiment, this process may be performed by a specific charging turbo train drive that is designed explicitly for charging and a second specific turbo train drive that is designed for discharging. In another embodiment, this process may be performed by a dual purpose turbo train drive that performs charging and discharging functions. In one embodiment, the TESS may use the Brayton cycle to apply thermodynamic work upon a working fluid and store the heat energy in a thermal heat sink.

The TESS of the present disclosure may include technology that is compact and rapidly integrated using control and dispatch techniques. In some embodiments, the TESS may also contain a power electronics system with capacitor discharge, to allow a near instantaneous grid synchronization and delivery of the power during the time the turbo system is in a start-up ramp. The heat store for the TESS may be a contained bed of pebbles and/or ceramic material that can be heated up to 1250° C. The heat store may be used to input energy into a working gas fluid that may later be expanded in a turbo expander and used to drive a generator. In some examples, the TESS may represent a particular class of battery. This class of battery has several advantages, including, for example, a long lifetime (e.g., about 25 years), a nearly unlimited charge and discharge cycle usage, and a normal limitation and cost driver of other types of flow or chemical batteries.

Conventional TES systems suffer from lower round-trip efficiency. The one or more TES systems disclosed herein are able to obtain a higher round-trip efficiency (from 0.50 to about 0.90) due to the closed loop nature of the charging and discharging cycles.

In one embodiment, the present system can store energy from renewable sources at off peak hours. In other embodiments, the power may be purchased from the grid during low demand periods or from spinning reserve sources. The present system can also dispatch the power during peak power demands. The system can remain charged for several days, using ceramic and refractory insulation. Due to the low working pressures and availability of suitable insulation materials, low-cost structural materials are applicable to house the heat sink and turbo machinery of the present disclosure.

The working cycles of the TESS of the present disclosure may support a low maintenance cost, high operational reliability, and improved cyclic working life (e.g., of about 25 years).

Analysis software, which simulates the thermodynamic cycle, may be used to provide an approximated working round-trip efficiency of the system. For example, simulations for the TESS of the present disclosure, using a cycle simulation model, illustrate a round-trip efficiency of about 70%. The working round-trip efficiency addresses both the charging and the generation cycle as a combined process. The round-trip efficiency (of about 70%) supports a low cost of operation. The combination of low capital cost, low service cost, long service life, and low operation cost combine to fill a gap in existing technology through the ability to achieve total life cycle costs that approach a current best-in-class generation cost point.

Figure 23:
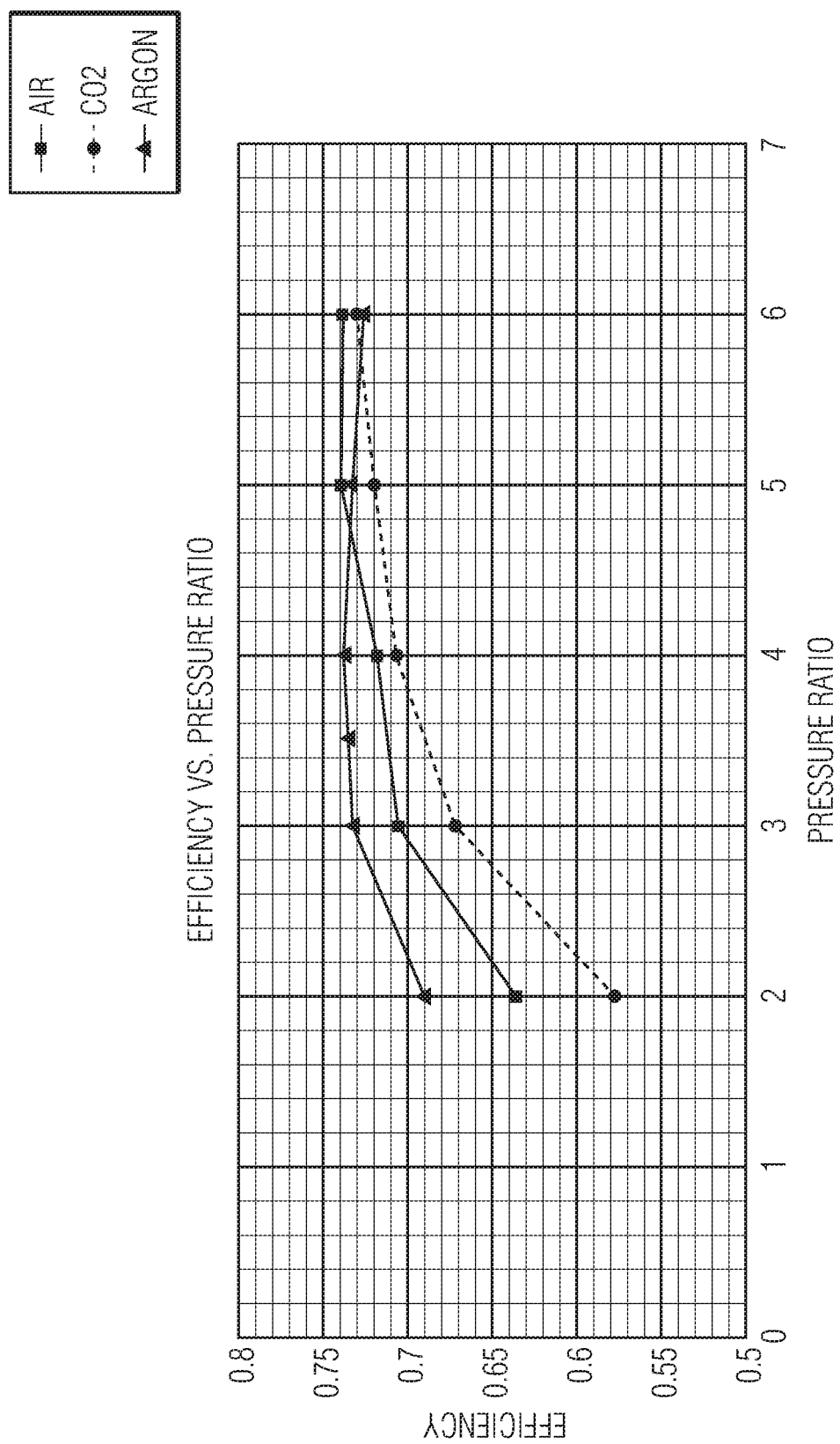
FIG. 23 is an example graph of efficiency as a function of pressure ratio for various gasses, according to an embodiment.

FIG. 23 is a graph of an example system efficiency as a function of compressor pressure ratio for various working fluids (e.g., air, carbon dioxide ($CO_2$) and argon (Ar), or a mixture thereof). It is understood that the working fluids illustrated in FIG. 23 are example working fluids. Other suitable and non-limiting examples of working fluids include helium (He), nitrogen ($N_2$), same like, and any type of mixture of gases.

FIG. 23 illustrates a working space to deliver an efficient system for a variety of materials, at a reasonable range of working compressor pressure ratios. The design space may be further analyzed to optimize selection of components of the TESS based on cost and performance using, for example, commonly available materials.

FIG. 1A illustrates a schematic of TESS 100 for thermal energy generation, storage, charging and discharging, according to one embodiment. TESS 100 may include compressor 102, heat rejection component 104 (to produce output heat $Q_{out}$), reservoir 106, recuperator 108, hot heat sink 110, expander 112, and turbo train drive 114. In some examples, compressor 102 and expander 112 may represent turbo compressor 102 and turbo expander 112.

In some examples, TESS 100 may utilize turbo-machinery drive train 114 having efficiency levels in the low to mid $80^{th}$ to mid-$90^{th}$ percentile. The heat cycle may be managed by TESS 100 to recycle heat exhausted from turbo expander 112 and to reject a minimum level of heat to the environment. In some examples, rejected heat may be captured by TESS 100, and further increase the efficiency of TESS 100. For example, reservoir 106 may store rejected heat in the generation phase for use in the charging phase, and may aid in enabling a high total cycle efficiency. Torque created by hot gas expansion in expander 112 may be used to drive compressor 102 and alternator (or generator) 116 fitted with power electronics to dispatch power on demand. In one embodiment, recuperator 108 may be located between an exit of compressor 102 and an inlet of hot heat sink 110 on one side, and between an exit of expander 112 and reservoir 106 inlet on the other side. Recuperator 108 may use some of the heat from expander 112 exit to preheat the working fluid before the working fluid enters hot heat sink 110.

Component 104 may be an ambient heat rejection system, which may operate during discharge. Recuperator 108 may be a counter flowing heat exchange that allows the heat, rejected during discharge, from expander 112 outlet to be used to preheat compressor 102 outlet prior to entering hot heat sink 110. Recuperator 108 may allow for TESS 100 to utilize a maximum amount of the available heat during the discharging phase. In some embodiments, a second recuperator (not shown) may be used in the charge cycle to use the heat from expander 112 inlet to preheat compressor 102 inlet and use an increased amount of available heat within the cycle and thereby increase efficiency of the overall system.

In some embodiments, compressor 102 may have a pressure ratio between about 1.1 and 35, depending on the type of working fluid used and the target round-trip efficiency of TESS 100. In some embodiments, compressor 102 may be an axial compressor, a radial compressor, or a combination axial-radial compressor, may be a single-stage expander or multiple stages compressor.

In some embodiments, expander 112 may have a pressure ratio between about 1.1 and 35, depending on the type of working fluid used and the target round-trip efficiency of TESS 100. In some embodiments, expander 112 may be an axial expander, a radial expander, may be a single-stage expander or multiple stages expander.

In one embodiment, a heat store temperature of hot heat sink 110 may be between about 600° C. to about 1250° C. In some embodiments, the discharge compressor inlet may be lower than the about 0° C. to 30° C. range. This working temperature range may aid in achieving a high (e.g., higher than 70%, such as 85%) round-trip system efficiency. The system working fluid can be chosen from common gases (e.g., air, nitrogen, argon, $CO_2$, He, any type of mixture thereof, or any suitable gas). These working fluids are readily available, safe to operate, and low cost. The example temperature range above allows use of ceramic, steel, and joining technology such that the initial cost of the system can be managed, and the reliability of the system may be driven to high levels due to the prior validation of special processes. Control for grid interface or microgrid applications may be used on an application-specific basis.

In operation, TESS 100 recirculates the working fluid based on, for example, a closed Brayton cycle. The working fluid expelled from expander 112 may be fed into compressor 102 which, in turn, heats the fluid and pumps the fluid into heat sink 110 (e.g., a pebble bed) for storage of the thermal energy, as shown in FIG. 1A. The resulting torque produced by the process may be used to turn alternator 116 to convert the thermal energy to electricity. The generation cycle may comprise an adiabatic compression of the gas from state 1 to state 2, a heat addition by using hot heat sink 110 at constant pressure to state 3, an adiabatic expansion to state 4 (where work is done), and an isobaric closure of the cycle back to state 1. In addition to hot heat sink 110, the TESS 100 may also employ recuperator 108 and reservoir 106 to aid in reducing the size requirements of both heat sink structures (i.e., reservoir 106 and hot heat sink 110) and improve the cycle efficiency. In a generation phase, recuperator 108 may be located between an exit of compressor 102 and the hot heat sink 110 on one side, and between an exit of expander 112 and an inlet of reservoir 106 on the other side. Recuperator 108 may use some of the expander 112 exit heat to preheat the working fluid before entering hot heat sink 110. At the same time, recuperator 108 allows for cooling the working fluid at the expander 112 exit before being input into reservoir 106. Reservoir 106 allows the use of some of the remaining thermal energy in the expander 108 exhaust flow during the charging phase. This additional heat sink (e.g., reservoir 106) makes it possible to achieve an improved cycle efficiency. The generation cycle also uses heat rejection component 104 to bring the expander 108 exit fluid temperature further down to its initial condition.

In one embodiment, the overall discharged (generation) phase efficiency and mass flow rate of cycle, shown in FIG. 1A, may be obtained from the below relationships. For example, in some embodiments, the expander 112 pressure ratio may be less than the compressor 102 pressure ratio to take into account the pressure loss in hot heat sink 110 and to overcome the pressure loss in recuperator 108.

Mass flow rate of cycle, ṁ [kg/s], may be calculated using Equation 1 to ensure a specific power production.

$$\dot{m} = \frac{\text{Power Production}}{\eta_{generator} * \dot{w}_{cycle}} \quad [1]$$

where, $\dot{w}_{cycle}$ [kJ/kg], is the net work out for per unit mass, and may be defined by:

$$\dot{w}_{cycle} = \dot{w}_{Exp.} + \dot{w}_{Comp.} \quad [2]$$

In Equation 2, $\dot{w}_{Exp.}$ and $\dot{w}_{Comp.}$ Represent the net work out per unit mass of expander 112 and compressor 102, respectively.

The heat added to the system, $Q_{HS}$ [kW].

The amount of heat stored in reservoir 106 used in charging phase, $Q_{CS}$ [kW].

Thus, the overall round trip efficiency, η.

$$\eta = \frac{\text{Power Production} * \eta_{generator}}{Q_{HS} - Q_{CS}} \quad [5]$$

In an embodiment, the following assumptions may apply to the cases: the Compressor Polytropic Efficiency may be close to 90%; the Expander Polytropic Efficiency may be around low 90th %; the recuperator efficiency could be around 90% (e.g., based off 8° C. to 36° C. of approach temperature); the Hot Storage out temperature may be close to 900° C.; the Generator efficiency may be around 95%. The example values are used further below in example working fluid analyses described with respect to FIG. 23.

Because compressor 102 and expander 108 inlet temperatures may be maintained constant (or nearly constant) for some cases, the overall efficiency of the cycle may only depend, in some examples, on the pressure ratio and the heat capacity ratio of the working fluid. The above relations also indicate that the maximum cycle efficiency may be achieved at the minimum mass flow rate because of the constant power production requirement.

In operation, during the discharge phase, compressor 102 may pressurize the low temperature working fluid. Pressurizing the low temperature working fluid may lead to a temperature rise due to adiabatic compression. The working fluid (now at a high pressure and a high temperature) may exit compressor 102 and enter recuperator 108. Recuperator 108 may preheat the working fluid by using the expander 112 exit heat prior to entering hot heat sink 110. In hot heat sink 110, the working fluid may pass through a packed-bed thermal energy storage, which is at a higher temperature than the incoming working fluid. Thus, as the working fluid passes through the storage material of hot heat sink 110, its temperature rises. In some embodiments, the temperature of the working fluid may rise to about the maximum system operating temperature. The working fluid (now heated and pressurized) may give up its thermal energy through an adiabatic expansion process as the working fluid flows through expander 108 (e.g., turbine). The resulting torque produced by this process may be used to turn an alternator 116. Alternator 116 may convert the mechanical energy to electrical energy. The high-temperature expander exhaust may be fed back into recuperator 108 where it may be used to increase the temperature of the working fluid (e.g., before it enters reservoir 106). After passing through recuperator 108, the working fluid may flow into reservoir 106, where, through a constant pressure process, it flows through a packed-bed of reservoir 106, delivering its thermal energy to the storage media. (Examples of hot heat sink 110 and reservoir 106 are described further below with respect to FIGS. 22A and 22B.) At this point, TESS 100 may also use heat rejection component 104 as a safety device to further reduce the fluid temperature to levels required by compressor 102 inlet.

FIG. 1B illustrates a charging schematic 150 for TESS 100, according to one embodiment. Charging schematic 150 may include turbo machinery. The turbo machinery comprises compressor 152, hot heat sink 154, recuperator 156, reservoir 158, expander 160, and turbo train drive shaft 162. In this mode, the TESS 150 may use motor 166 to drive turbo train drive shaft 162 to charge hot heat sink 154 for discharge. Reservoir 158 may aid in using waste heat from generation to be reapplied and to aid in improving the efficiency on a round trip basis (e.g., of approximately 70%). In one embodiment, TESS 150 may use a standard gas heater instead of turbomachinery to deliver the charging heat. A more detailed description of one or more components illustrated in FIGS. 1A and 1B is provided below.

The turbo machinery is an integral component of TESS 100. This equipment has been extensively analyzed and applied, in many applications in power generation and transportation. Given such thorough analysis and application, the equipment efficiency and reliability is enhanced. Presently, the efficiency of each component of the turbo machinery (i.e., compressor 102 (152), expander 112 (160), and alternator 116) is between the low to upper $80^{th}$ to the mid-$90^{th}$ percentiles.

In some embodiments, TESS 100 may include additional stages of compression, for example to take advantage of a higher efficiency provided by the higher compression ratio. For example, additional stages of compression may target compression and expansion efficiencies are in the low to upper $80^{th}$ to $90^{th}$ percentiles. Achieving these efficiencies represents about a 6%-8% improvement over conventional systems. The overall design process may be guided, for example, by a life cycle cost trade-off and an overall reliability of the system.

In some embodiments, compressor 152 may have a pressure ratio between about 1.1 and 35, depending on the type of working fluid used and the target round-trip efficiency of TESS 100 and TESS 150. In some embodiments, compressor 152 may be an axial compressor, a radial compressor, or a combination axial-radial compressor, may be a single-stage expander or multiple stages compressor.

In some embodiments, expander 160 may have a pressure ratio between about 1.1 and 35, depending on the type of working fluid used and the target round-trip efficiency of TESS 100 and TESS 150. In some embodiments, expander 160 may be an axial expander, a radial expander, may be a single-stage expander or multiple stages expander.

Referring again to FIG. 1B, turbo train drive 162 (illustrated in FIG. 1B), and/or a working fluid heater, may be configured to charge heat sink 154. The decision to use a charging turbo set (e.g., turbo train drive 162) or heater (e.g., a working fluid heater) may be based upon a simulation and analysis process. Components suitable to configure the charging system may be selected based on one or more factors such as cost, performance, and reliability.

Referring back to FIG. 1A, as discussed above, TESS 100 may drive alternator 116. In some examples, alternator 116 may represent a combination of motor and generator. In some examples, a motor mode of alternator 116 may be used to charge the system using the work performed by the turbo shaft to heat the working fluid. A generator mode of alternator 116 may be used to generate power from the stored thermal energy drive of the turbo train drive 114. In some examples, alternator 116 may include a permanent magnet machine with matching power electronics, to allow a high efficiency and straight forward power electronics interface.
\
FIG. 1B illustrates one possible charging cycle diagram utilized by TESS 100, according to example embodiments. In the charging phase, TESS 100 may use motor 166 to drive the turbo machinery to recirculate high temperature working fluids in, for example, a closed Brayton cycle to charge hot heat sink 154 used during the discharging phase. The charging cycle may include an adiabatic compression of the working fluid from the state 1 to 2, an isobaric heat exchange to state 3 from the working fluid to the heat sink media (i.e., hot heat sink 154), an adiabatic expansion to state 4, and finally heat addition using reservoir 158 media to working fluid at constant pressure back to state 1. As previously mentioned, reservoir 158 allows TESS 100 to utilize the thermal energy in the expander 160 exhaust flow during the charging phase, which directly impacts round-trip efficiency. In the charging phase, in one embodiment, an additional recuperator (not shown) may be employed. For example, an additional recuperator may be located between hot heat sink 154 exit and expander 160 inlet on a high pressure side, between reservoir 158 exit and compressor 152 inlet on the low system pressure side. The additional recuperator may use hot heat sink 154 exit working fluid to preheat the working fluid before going into compressor 152. In a charging cycle, it is also possible to have an additional subsystem, such as cooling working fluid by heat rejection (as shown by heat rejection component 170), to improve reservoir 158 usage to achieve higher round-trip efficiency.

Hot heat sink 110 is another integral element of TESS 100. In some embodiments, hot heat sink 110 may include a core for thermal storage, contained by a pressure liner, insulation, and an outer pressure vessel. The configuration may be used to reduce pumping loss or pressure drop through hot heat sink 110. A conceptual diagram of hot heat sink 110 is shown in FIG. 22A and a conceptual diagram of reservoir 158 is shown in FIG. 22B.

Figure 22B:
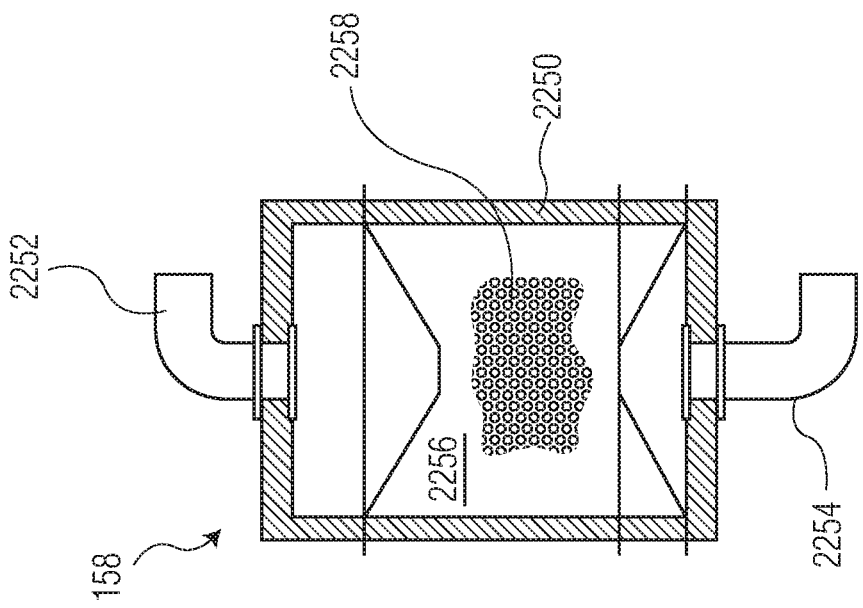
FIG. 22B is a cross-sectional diagram of an example reservoir, according to an example embodiment.
Figure 22A:
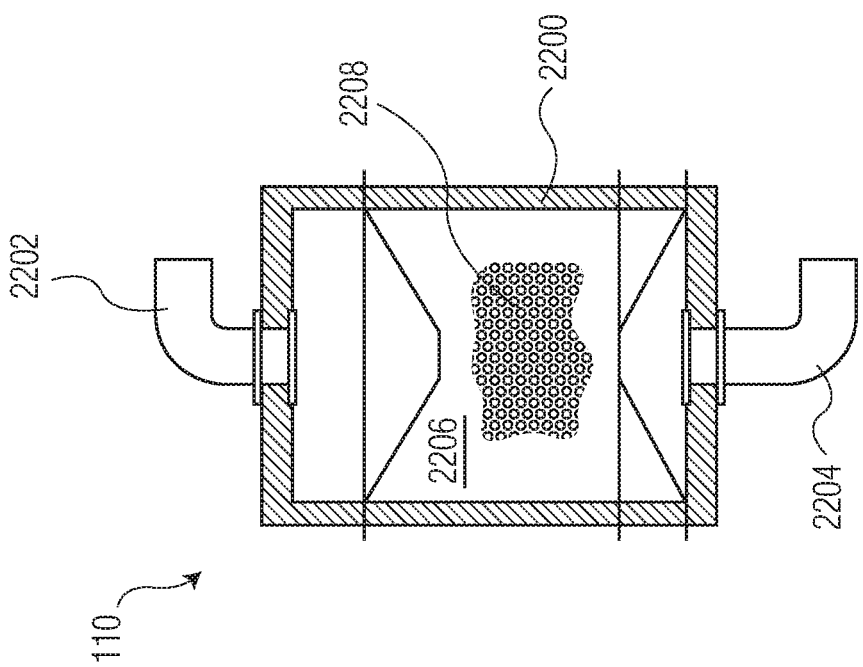
FIG. 22A is a cross-sectional diagram of an example hot heat storage, according to one embodiment.

For example, as shown in FIG. 22A, hot heat sink 110 may include a body 2200, an inlet 2202, and an outlet 2204. Body 2200 may define interior volume 2206. Disposed in interior volume 2206 may be heating media 2208. Heating media 2208 may be one or more of a bed of loosely packed sensible heat storage material, such as pebbles, gravel, rocks, alumina oxide ceramic, cordierite honeycomb ceramic, dense cordierite honeycomb ceramic, etc. These storages may be well insulated, so they do not lose more than about 15% of heat during 24 hours of holding time.

As shown in FIG. 22B, reservoir 158 may include a body 2250, an inlet 2252, and an outlet 2254. Body 2250 may define interior volume 2256. Disposed in interior volume 2256 may be heating media 2258. Heating media 2258 may be one or more of a bed of loosely packed sensible heat storage material, such as pebbles, gravel, rocks, alumina oxide ceramic, cordierite honeycomb ceramic, dense cordierite honeycomb ceramic, etc. These storages may be well insulated, so they do not lose more than about 15% of heat during 24 hours of holding time.

The maximum operating temperatures of both hot heat sink 110 and reservoir 158 may be between about 650° C. and about 1250° C. For example, the operating temperature for a 2 MW hot heat sink 110 (or reservoir 158) may be about 935° C. In another example, the operating temperature for a hot heat sink 110 (or reservoir 158) between about 25 to about 50 MW may be about 1200° C. The minimum operating temperatures of both hot heat sink 110 and reservoir 158 may be in the range of 0° C. to about 650° C. Both hot heat sink 110 and reservoir 158 may be configured with various suitable materials, including, but not limited to example materials shown in Table 1.

The minimum operating temperature of the charging cycle may occur between expander 160 and reservoir 158. For example, the minimum operating temperature may be as low as −70° C. A temperature at the inlet of compressor 152 may be between about 0° C. and about 30° C. In some embodiments, compressor 152 pressure ratio (the ratio of the high-pressure to the low-pressure values) of TESS 150 may depend on the working fluids and target round-trip efficiency.

Table 1, as shown below, provides an example listing of suitable materials for hot heat sink 110 and reservoir 158.

TABLE 1

| | KANTHAL ® A-1 | Alumina Oxide | Honeycomb Ceramic |
|---|---|---|---|
| Density [kg/m³] | 7100 | 3720 | 2300 |
| Cp [kJ/kg*K] | 0.720 | 0.880 | 1.150 |
| ε - porosity | 0.4 | 0.4 | 0 |

One factor in determining material selection is the specific heat (Cp) of the material. The higher the value for specific heat, the lower the mass and overall system footprint may be. $Q_{HS}$ represents sensible heat of hot storage. During a charging phase, $Q_{HS}$ is the thermal energy added to heat sink 110; during discharging phase, $Q_{HS}$ is the heat addition to working fluid from heat sink 110. Material selection may also be guided by system cost as well as robustness for many years (e.g., 25 years) of service. KANTHAL® material could also be replaced with carbon steels (e.g., typically used for bearing applications). In an example embodiment, the material choice for hot heat sink 110 may be ceramic honeycomb, commonly called cordierite. This material is predominantly an aluminum oxide/silicon oxide ceramic honeycomb with a suitable working temperature range and specific heat. The cost of the media and the ability to load and unload the vessel may be a factor to finalizing the design of hot heat sink 110.

Another design consideration for hot heat sink 110 and reservoir 158 is the management of flow through heat sink 110 and reservoir 158. Configuration of heat sink 110 and reservoir 158 to ensure uniform flow and predictable discharge output temperatures aid in delivering an overall round trip system of increased efficiency.

The heat recovery store system (i.e., reservoir 106) may be similar to the hot store system (i.e., hot heat sink 110); however, the temperature ranges and the cyclic loading of the heat recovery store system (106) may be lower than that of the hot heat sink system (110). Exemplary embodiment, reservoir 106 has an inlet temperature of about 425° C. and an exit temperature of about 50° C. during generation for a cycle using a specific compression ratio. These values may modulate based on the compression ratio of the reservoir 106. Reservoir 106 may aid in improving the round-trip efficiency during cycle charging. These working conditions may also allow a broader choice in heat sink material, allowing use, for example, of one or more steels, crushed granite, or water glycol sinks. The selection of the material for reservoir 106 may be based on cost and/or packaging optimization.

Table 2 illustrates an example scoping of reservoir media and example suitable volumes for reservoir 106.

TABLE 2

| | | Density (kg/m³) | Cp (kJ/kg*K) | $Q_{CS}$ (kW) for 2 MW | Number of Vessels based on 6.283 m³ each |
|---|---|---|---|---|---|
| Solid Storage Media | Sandrock-Mineral Oil | 1700 | 1.30 | 2143.34 | 45 |
| | Reinforced Concrete | 2200 | 0.85 | 2143.34 | 53 |
| | NaCl (solid) | 2160 | 0.85 | 2143.34 | 54 |
| | Cast Iron | 7200 | 0.56 | 2143.34 | 25 |
| | Cast Steel | 7800 | 0.60 | 2143.34 | 21 |
| | Silica fire bricks | 1820 | 1.00 | 2143.34 | 54 |
| | Magnesia fire bricks | 3000 | 1.15 | 2143.34 | 29 |
| Liquid Storage Media | Carbonate Salts | 2100 | 1.80 | 2143.34 | N/A |
| | Liquid Sodium | 850 | 1.30 | 2143.34 | N/A |

TESS 100 may also use heat rejection component, such as a closed loop chiller, as part of safety device and may use for to further reduce the working fluid temperature if necessary. In some embodiments, the ambient heat rejection system 104 may fit within a 10×22 foot print, and may have a 20 year life span. Revision of the system to achieve a 25 year life is considered readily achievable, based on operation experience and some attention to pump selection.

Although not shown, TESS 100 may include control electronic for controlling operation of one or more of compressor 102, heat rejection component 104, reservoir 106, recuperator 108, hot heat sink 110, expander 112, turbo machinery (e.g., drive train 114) and alternator 116 (and in some examples motor 166). Control of TESS 100 may include an interface (not shown) to the turbo machinery to select either generation or charge modes. The charge mode may consider the cost of the charging source and accept the charge, based on availability for renewable storage or based on acceptance on the cost of available grid supply. In one embodiment, the grid supply may be power from spinning reserve generation, which may be an off-peak generation with low price point. Renewable supply may be based on availability of renewable generation and timing outside of peak demand.

Temperature status of the pebble bed of hot heat sink 110 (as well as reservoir 106, in some examples) may be monitored (e.g., by the control electronics) during charge and generation, to sequentially move through the hot heat sink pebble bed of hot heat sink 110, and control the selected process (e.g., charge or generation processes). In one embodiment, a series of temperature sensors and control logic may switch between groups of the pebble bed vessels using established temperature criteria.

In one embodiment, a grid interface during generation of the control system (not shown) may also be interfaced to a capacitor bank (not shown) that may provide immediate (or almost immediate) grid synchronization, when demanded, to allow instantaneous (or near instantaneous) supply of power based on demand. For example, the power supply may have a duration of 1-2 minutes, to allow the thermal battery to be at full generation capacity and take over the demand load.

During the charge phase of operation, the capacitor bank may be recharged, followed by recharge of the pebble bed of hot heat sink 110.

A control footprint for the controller and power electronics may be formed in a compact manner. Various options may be available for interface of TESS 100 to utility generation control through supervisor control communication protocols.

TESS 100 may be formed as a flexible configuration, to allow a permanent installation on a conventional foundation or a mobile application on trailers or barges. In one embodiment, components of TESS 100 may be packaged on standard 8 foot by 53 foot trailers. Alternate packaging on low height trailers can afford the potential to drop the system on the trailers, by removing wheels and interconnecting the piping between individual systems. In some examples, a weight of reservoir 106 and heat sink 110 may require separate loading after site placement, however, this loading may be achieved with standard portable crane service.

In one embodiment, site preparation for TESS 100 may include a soil compaction, followed by laying a bed of crushed aggregate and placing skids of structural steel to support each component. The components may include a pebble bed array (i.e., one or more hot heat sinks 110), a reservoir array (i.e., one or more reservoir 106), and a third skid for the turbo machinery (i.e., compressor 102, expander 112, drive train 114)/ambient heat rejection (i.e., one or more heat rejection components 104). Interconnecting pipe may link the three skids. Controls can be placed in an existing control room or a separate conex for local interface and remote control from an established control facility. In one embodiment, a final configuration may include skid wrapping for commercial branding. This approach may provide a flexible deployment capability and allow economical siting.

Referring back to FIG. 1B, in operation, during a charging cycle, motor 166 may rotate turbo train drive shaft 162 to provide movement to compressor 152 and expander 160. The working fluid may be continuously drawn into compressor 152. Compressor 152 may raise the temperature and pressure of the working fluid during a compression process.

Working fluid may exit compressor 152 (at an elevated temperatures) and may enter hot heat sink 154. In hot heat sink 154, the working fluid may transfer its heat to hot heat sink 154 and may exit hot heat sink 154 at a lower thermal energy but at the same pressure. The working fluid may then enter recuperator 156. In recuperator 156, additional thermal energy may be removed from the working fluid at a constant pressure without inducing a phase change, which is used to the preheat the low pressure working fluid before it enters compressor inlet. Next, working fluid may flow through expander 160 where its pressure is reduced to about an amount similar to its pressure at the compressor 152 inlet. Accordingly, any system losses may prevent full pressure recovery. The working fluid may also experience a drop in temperature as its pressure reduces in expander 160. At this point, the working fluid may flow through heat rejection component 170. Heat rejection component 170 may act as a safety mechanism. Heat rejection component 170 may also be configured to further reduce the temperature of the working fluid. Accordingly, the working fluid (now cold) may enter reservoir 158. In reservoir 158, the working fluid may be heated as it travels through the storage media (contained in reservoir 158) at a constant pressure. The working fluid (now pre-heated) may enter recuperator 156, where heat is extracted from the work fluid on the high-pressure side to further raise the temperature of the working fluid on the low-pressure side to levels seen at the inlet of compressor 152.

Figure 2:
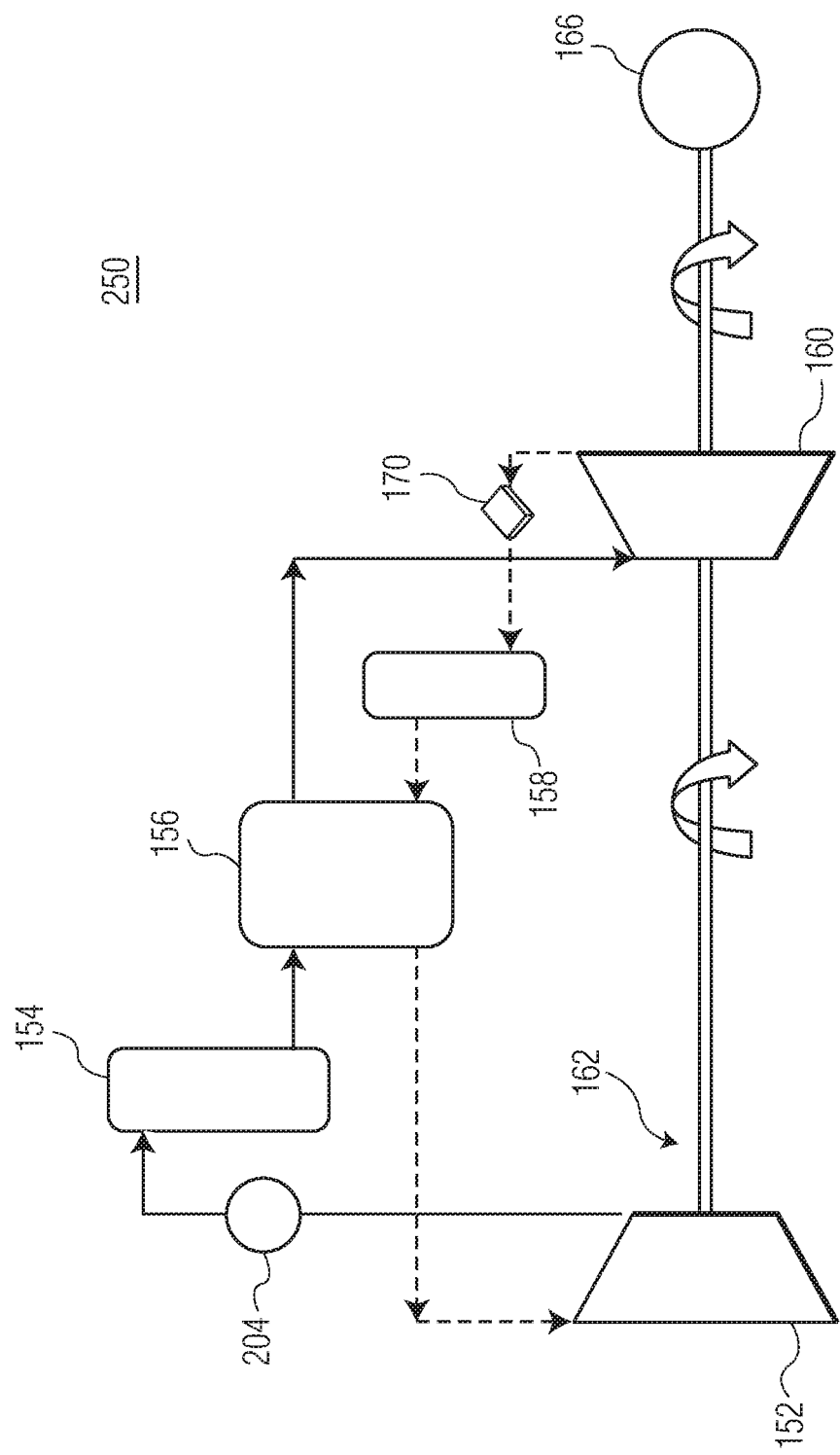
FIG. 2 illustrates a schematic of an example TESS, according to another embodiment.

FIG. 2 illustrates a charging schematic for TESS 250, according to example embodiments. TESS 250 may be similar to TESS 150 illustrated above in conjunction with FIG. 1B. TESS 250 may further include a heat booster 204. Heat booster 204 may be positioned between compressor 152 and hot heat sink 154 in the high temperature/pressure side of TESS 250. For example, heat booster 204 may added to the charging cycle downstream of compressor 152 and before hot heat sink 154. In some embodiments, heat booster 204 may be an electrical heater. In some embodiments, heat booster 204 may be a natural gas-fired heater located at on the line for the simplicity of the design and to allow better usage of storage volume. The addition of heat booster 204 to TESS 250 may aid in reducing the cost of turbomachinery by limiting the temperature of working fluid at the exit of compressor 152. In some embodiments, the addition of heat booster 204 to TESS 250 may increase the highest operating temperature of TESS 250, which may yield higher round-trip efficiency.

Figure 3:
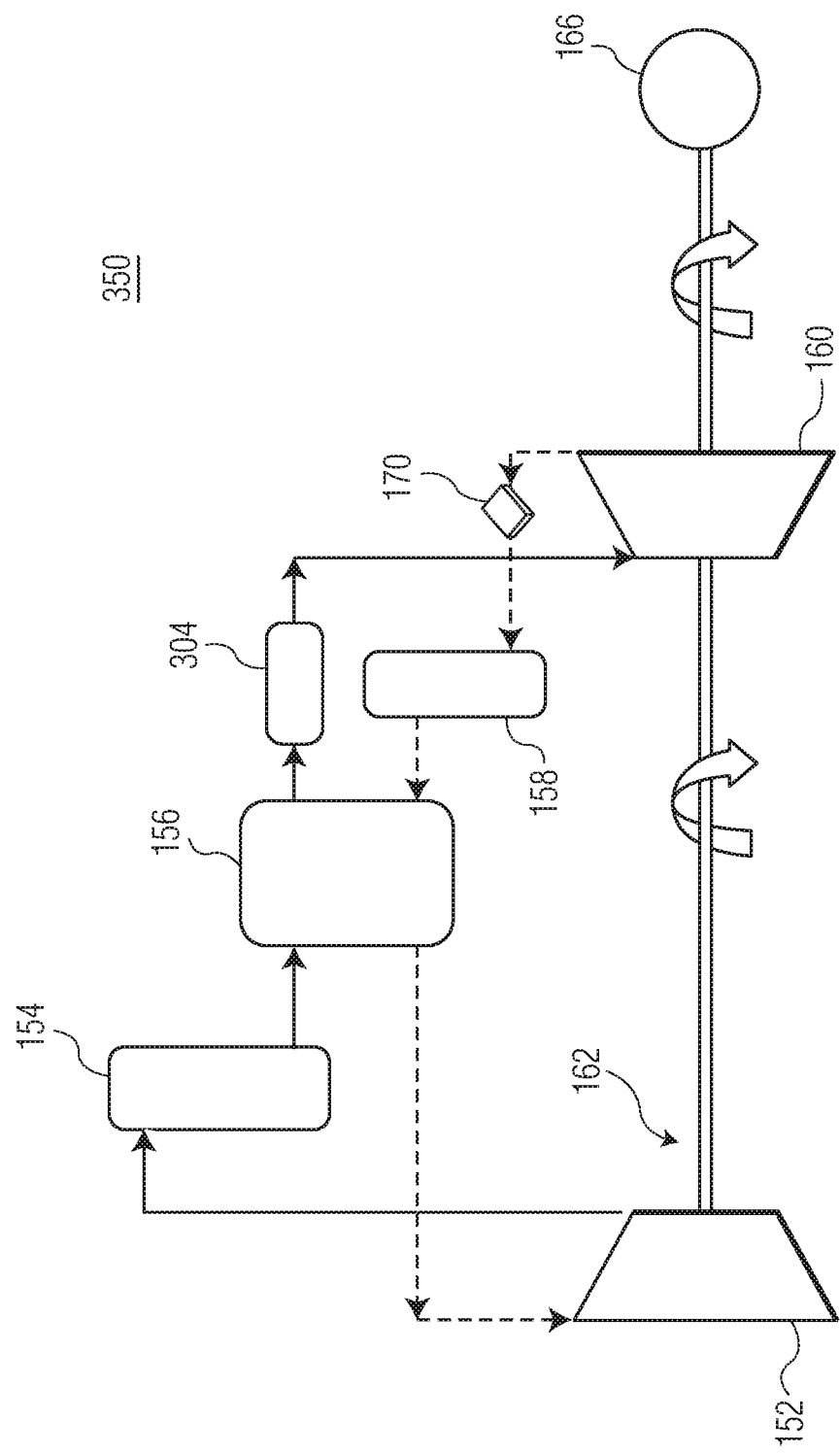
FIG. 3 illustrates a schematic of an example TESS, according to another embodiment.

FIG. 3 illustrates a charging schematic for TESS 350, according to example embodiments. TESS 350 may be similar to TESS 150 illustrated above in conjunction with FIG. 1B. TESS 350 may further include bottoming cycle subsystem 304 (also referred to herein as "bottoming cycle" 304). Bottoming cycle 304 may be configured to extract energy from the waste heat between the downstream of recuperator 156 and inlet of expander 160 on the high temperature/high pressure side.

The addition of bottoming cycle 304 may increase the use of the reservoir 158. For example, TESS 350 may maximize thermal storage during discharging and minimize ambient rejection to maintain thermal balance between discharging/charging phases and yield much higher round-trip efficiency than systems without a bottoming cycle. For example, round trip efficiency may increase about 10% from 70% (without bottoming cycle 304) to about 80% (with bottoming cycle 304). In such a formation, heat rejection component 170 may be used for system safety.

In operation, the working fluid in the main cycle (e.g., TESS 150, TESS 250) may pass through hot heat sink 154 to communicate or deliver waste heat to bottoming cycle 304. Bottoming cycle 304 may be configured to operate as one or more of, for example, a Rankine, Organic Rankine, and Supercritical carbon dioxide cycle, which operation may depend on a maximum available thermal energy in TESS 350.

Figure 4:
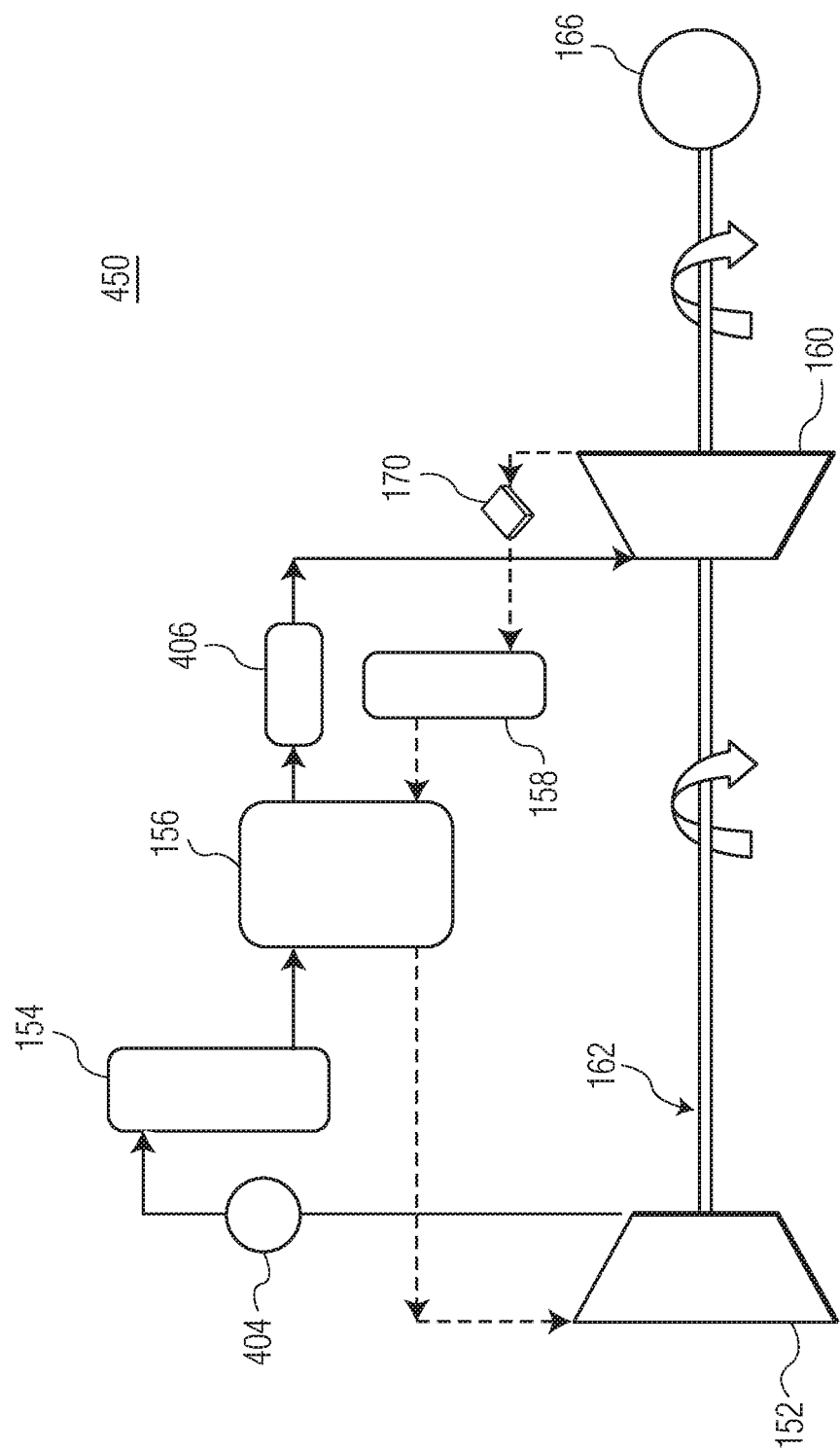
FIG. 4 illustrates a schematic of an example TESS, according to another embodiment.

FIG. 4 illustrates a charging schematic for TESS 450, according to example embodiments. TESS 450 may be similar to TESS 150 illustrated above in conjunction with FIG. 1B. TESS 450 may further include heat booster 404 and bottoming cycle 406. Heat booster 404 and bottoming cycle 406 may be added to the high temperature/high pressure side. For example, as illustrated, heat booster 404 may be positioned downstream of compressor 152 and upstream of hot heat sink 154. Bottoming cycle 406 may be positioned downstream of recuperator 156 and upstream of expander 160. Use of heat booster 404 and bottoming cycle 406 may reduce a cost of compressor 152 by limiting the working fluid exit temperature. Use of heat booster 404 and bottoming cycle 406 may also increase TESS 400 round-trip efficiency by increasing a maximum operating temperature.

Figure 5:
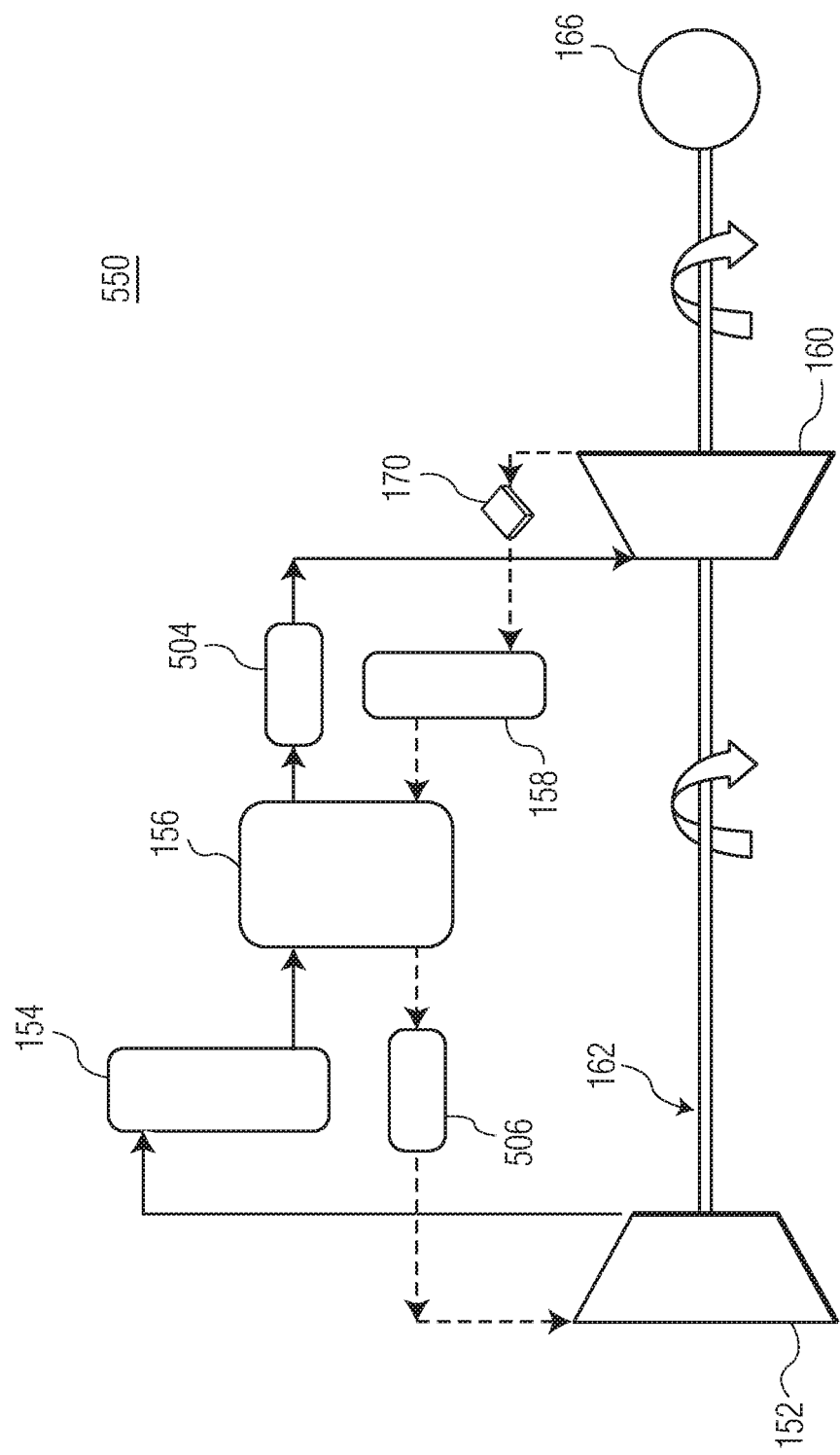
FIG. 5 illustrates a schematic of an example TESS, according to another embodiment.

FIG. 5 illustrates a charging schematic for TES 550, according to example embodiments. TES 550 may be similar to TESS 150 illustrated above in conjunction with FIG. 1B. TES 550 may further include first bottoming cycle 504 and second bottoming cycle 506. First bottoming cycle 504 may be added to the high temperature/high pressure side. Second bottoming cycle 506 may be added to the low temperature/low pressure side. For example, as illustrated, first bottoming cycle 504 may be positioned downstream of recuperator 156 and upstream of expander 160; second bottoming cycle 506 may be positioned downstream of recuperator 156 and upstream of compressor 152.

Figure 6:
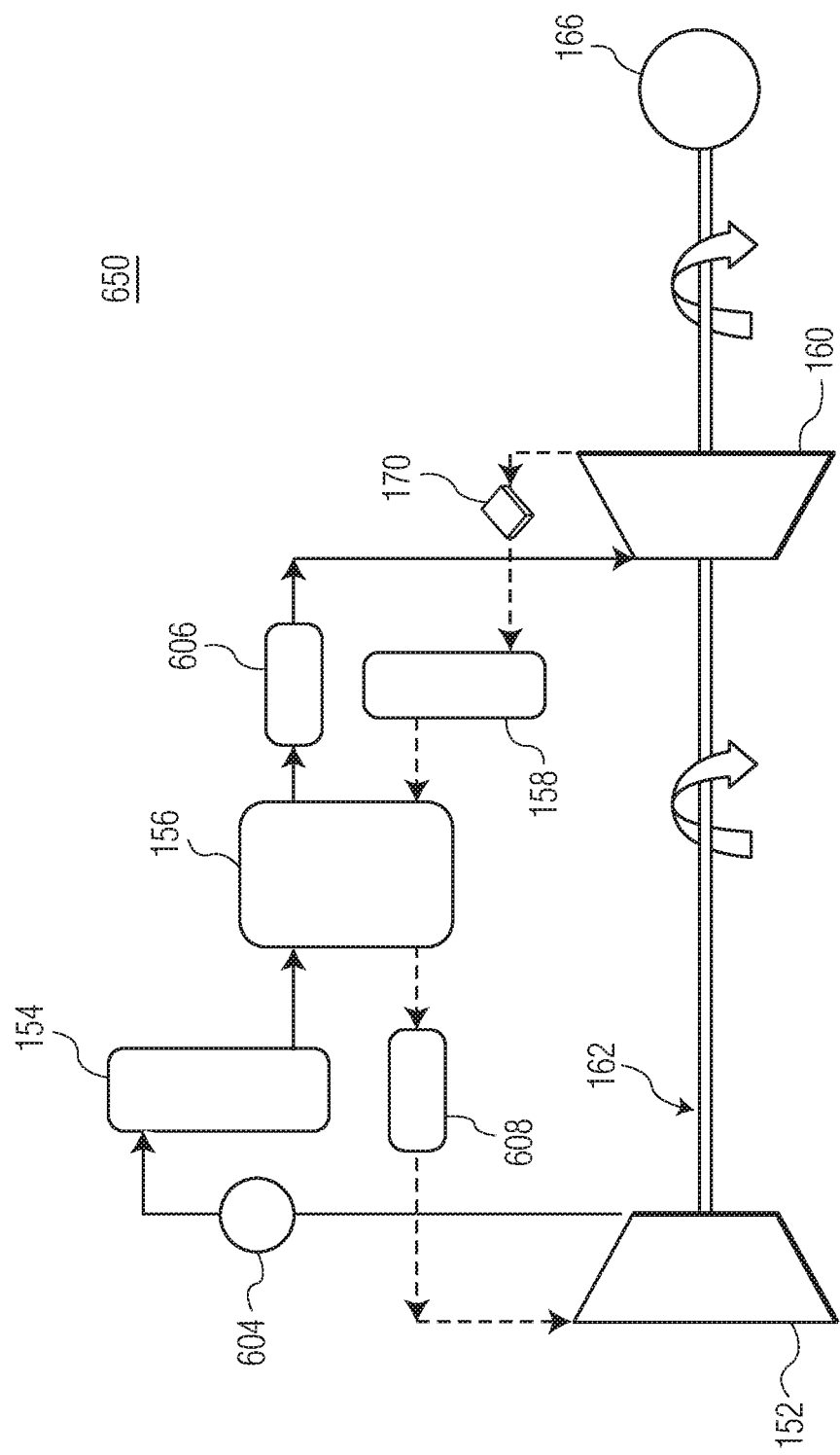
FIG. 6 illustrates a schematic of an example TESS, according to another embodiment.

FIG. 6 illustrates a charging schematic for TESS 650, according to example embodiments. TESS 650 may be similar to TESS 150 illustrated above in conjunction with FIG. 1B. TESS 650 may further include heat booster 604, first bottoming cycle 606, and second bottoming cycle 608. Heat booster 604 and first bottoming cycle 606 may be added to the high temperature/high pressure side. Second bottoming cycle 608 may be added to the low temperature/low pressure side. For example, as illustrated, heat booster 604 may be positioned downstream of compressor 152 and upstream of hot heat sink 154; first bottoming cycle 606 may be positioned downstream of recuperator 156 and upstream of expander 160; and second bottoming cycle 608 may be positioned downstream of recuperator 156 and upstream of compressor 152.

Such configuration may result in possible cost savings from compressor 152 design because of the low temperature of exit working fluid. Heat booster 604 may be utilized to increase the working fluid temperature exiting compressor 152 to a desired level. The power output of both bottoming cycles (606 and 608) may be configured to supply power to heat booster 604.

FIG. 7A illustrates a discharging schematic for TESS 700, according to example embodiments. TESS 700 may be similar to TESS 100 illustrated above in conjunction with FIG. 1A. For example, TESS 700 may include a compressor 702 (similar to compressor 102), recuperator 706 (similar to recuperator 108), hot heat sink 704 (similar to hot heat sink 110), expander 710 (similar to expander 112), turbo train drive 712, and power system 716 (similar to power system 116). However, TESS 700 does not include a reservoir.

As illustrated, in a high temperature/high pressure side (illustrated by the solid line), recuperator 706 may be upstream of compressor 702; hot heat sink 704 may be upstream of recuperator 706; and expander 710 may be upstream of hot heat sink 704. In a low temperature/low pressure side (illustrated by the dashed line), recuperator 706 may be downstream of expander 710; heat rejection component 720 may be downstream of recuperator 706; and compressor 702 may be downstream of heat rejection component 720. TESS 700 may further include bottoming cycle 722. Bottoming cycle 722 may be utilized in the discharging phase to extract energy from the working fluid immediately downstream from recuperator 706.

FIG. 7B illustrates a charging schematic for TESS 750, according to example embodiments. TESS 750 may be similar to TESS 150 illustrated above in conjunction with FIG. 1B. For example, TESS 750 may include compressor 752 (similar to compressor 152), recuperator 756 (similar to recuperator 156), hot heat sink 754 (similar to heat sink 154), expander 760 (similar to expander 160), turbo train drive 762, and power system 766 (similar to compressor 166). However, TESS 700 does not include a reservoir.

As illustrated, in a high temperature/high pressure side (illustrated by solid line), hot heat sink 754 may be upstream of compressor 752; recuperator 756 may be upstream of hot heat sink 754; and expander 760 may be upstream of recuperator 760. In a low temperature/low pressure side (illustrated by dashed line), recuperator 756 may be downstream of expander 760; and compressor 752 may be downstream of recuperator 756. TESS 700 may further include heat booster 775. For example, heat booster 775 may be added on the low temperature/low pressure side downstream of expander 760 and upstream of recuperator 756. Heat booster 775 may be used to preheat the working fluid before entering recuperator 756.

Figure 8:
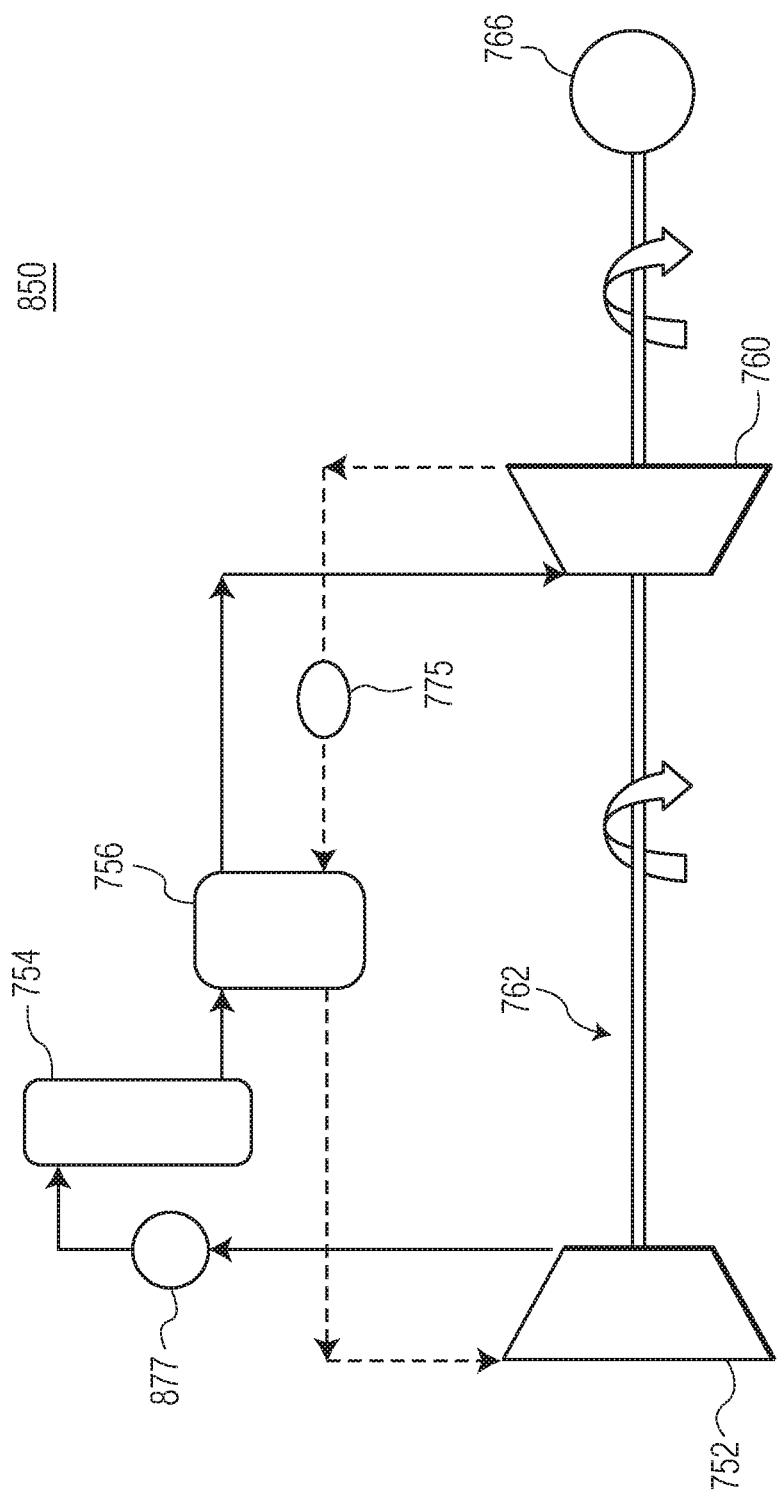
FIG. 8 illustrates a schematic of an example TESS, according to another embodiment.

FIG. 8 illustrates a charging schematic for TESS 850, according to example embodiments. TESS 850 may be similar to TESS 750 illustrated above in conjunction with FIG. 7B. For example, FIG. 8 may illustrated a counterpart charging schematic for the discharging schematic illustrated in FIG. 7A. TESS 850 may further include heat booster 877. Heat booster 877 may be added to the high temperature/high pressure side. For example, as illustrated, heat booster 877 may be positioned downstream of compressor 752 and upstream of hot heat sink 754. Such configuration may improve round trip efficiency by increasing the maximum operating temperature of TESS 850.

Figure 9:
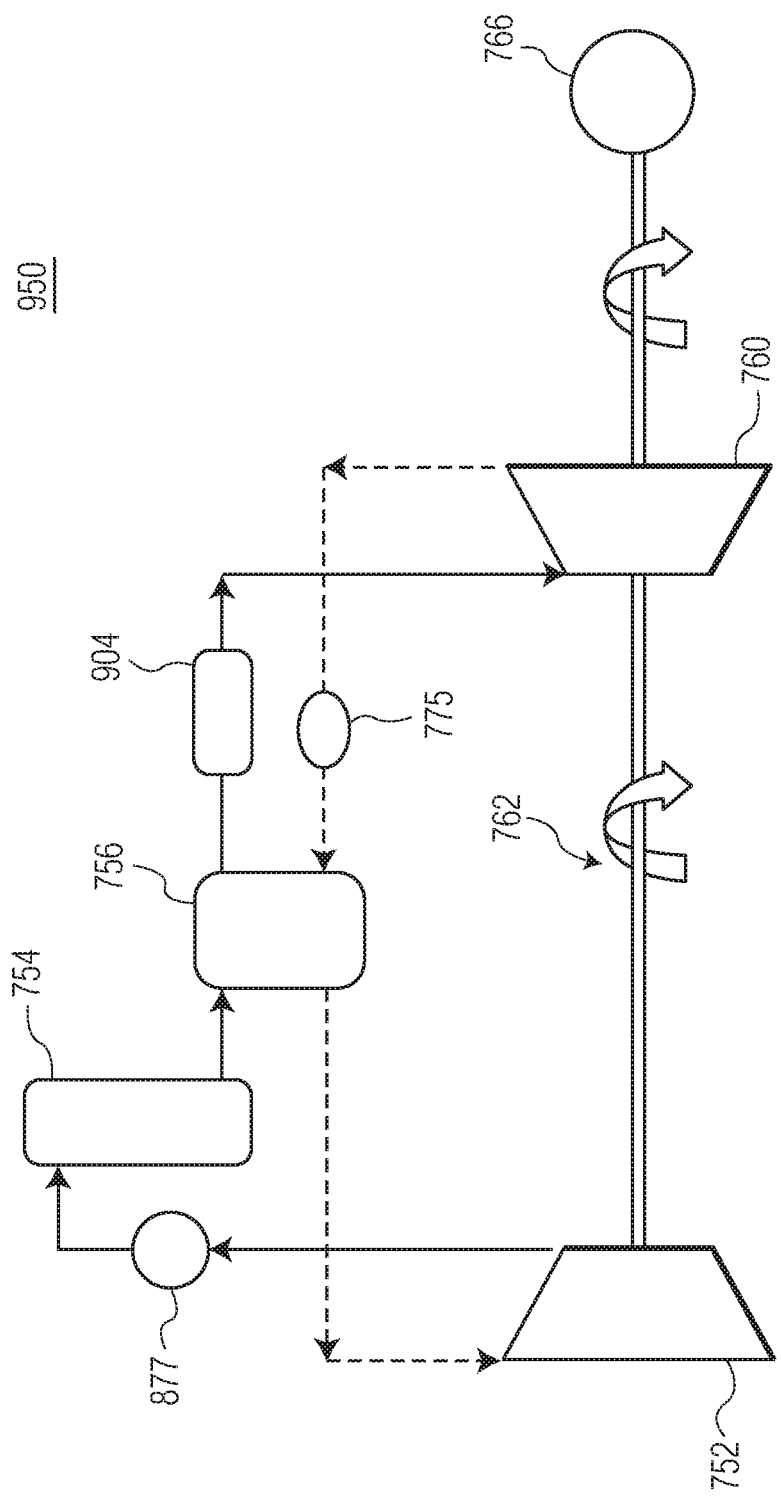
FIG. 9 illustrates a schematic of an example TESS, according to another embodiment.

FIG. 9 illustrates a charging schematic for TESS 950, according to example embodiments. TESS 950 may be similar to TESS 850 illustrated above in conjunction with FIG. 8B. For example, FIG. 9 may illustrate a counterpart charging schematic for the discharging schematic illustrated in FIG. 7A. TESS 950 may further include bottoming cycle 904. Bottoming cycle 904 may be added to the high temperature/high pressure side. For example, as illustrated, bottoming cycle 904 may be positioned downstream of recuperator 756 and upstream of expander 760. Such configuration may improve round trip efficiency by increasing the maximum operating temperature of TESS 950. Such bottoming cycle 904 may improve overall round-trip efficiency. Bottoming cycle 904 may also be configured to provide power to one or more heat boosters 775, 877.

Figure 10:
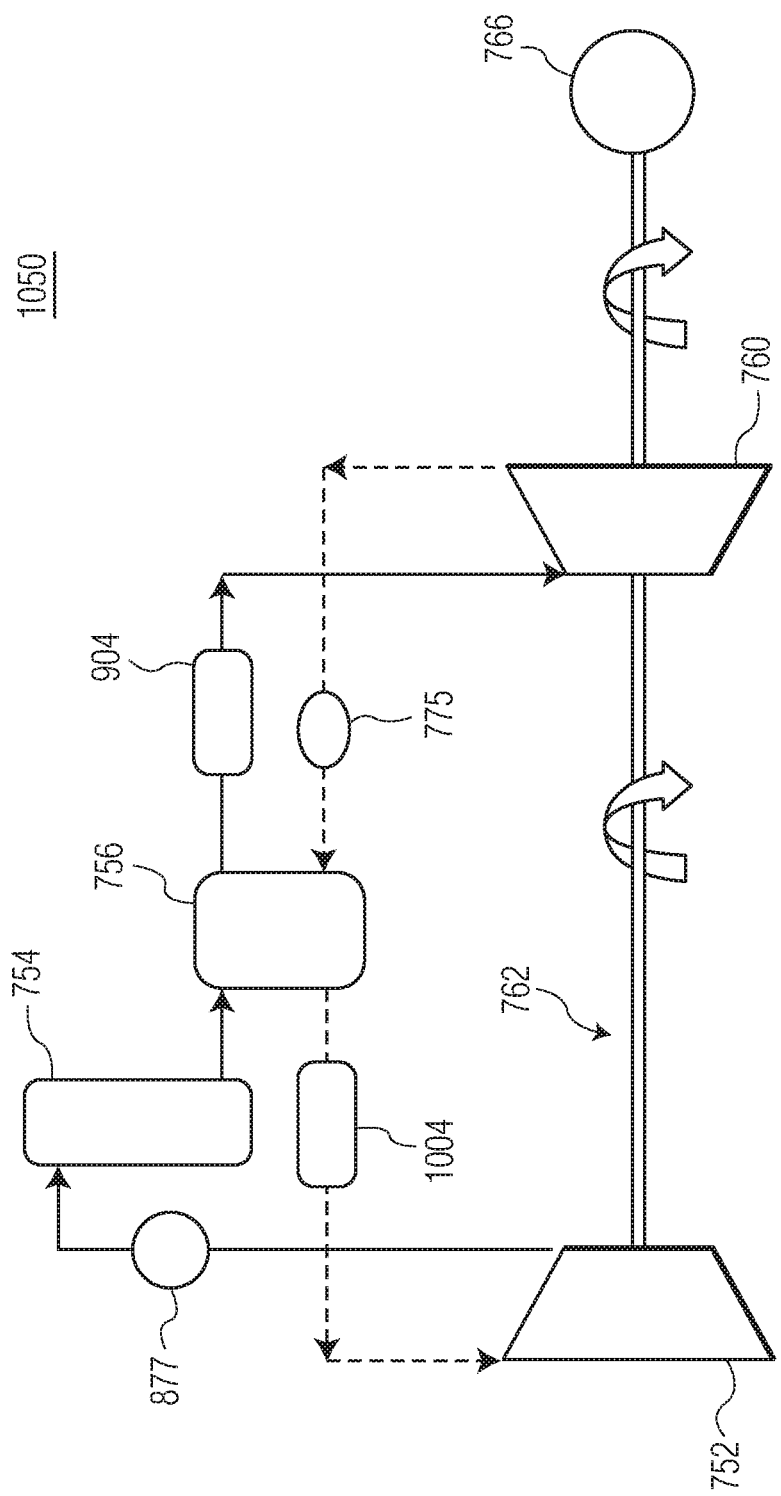
FIG. 10 illustrates a schematic of an example TESS, according to another embodiment.

FIG. 10 illustrates a charging schematic for TESS 1050, according to example embodiments. TESS 1050 may be similar to TESS 950 illustrated above in conjunction with FIG. 9. For example, FIG. 10 may illustrate a counterpart charging schematic for the discharging schematic illustrated in FIG. 7A. TESS 1050 may further include bottoming cycle 1004. Bottoming cycle 1004 may be added to the low temperature/low pressure side. For example, as illustrated, bottoming cycle 1004 may be positioned downstream of recuperator 756 and upstream of compressor 752. Such configuration may improve round trip efficiency by increasing the maximum operating temperature of TESS 1050. Such bottoming cycle 1004 may improve overall round-trip efficiency. Bottoming cycle 1004 may also be configured to provide power to one or more heat boosters 775, 877.

FIG. 11A illustrates a discharging schematic of TESS 1100, according to example embodiments. TESS 1100 may be similar to TESS 100 illustrated above in conjunction with FIG. 1A. TESS 1100 may include compressor 1102, hot heat sink 1104, expander 1110, reservoir 1108, heat rejection component 1120, alternator 1116, and turbo train drive 1112.

TESS 1100 may include a high temperature/high pressure side (illustrated by a solid line) and a low temperature/low pressure side (illustrated by a dashed line). Along the high temperature/high pressure side, hot heat sink 1104 may be positioned downstream of compressor 1102. Compressor 1102 may be configured to pressurize and heat working fluid input into TESS 1100 through an adiabatic compression process. In some embodiments, compressor 1102 may have a pressure ratio between about 1.1 and 35, depending on the type of working fluid used and the target round-trip efficiency of TESS 1100. In some embodiments, compressor 1102 may be an axial compressor, a radial compressor, or a combination axial-radial compressor, may be a single-stage expander or multiple stages compressor.

In some embodiments, expander 1110 may have a pressure ratio between about 1.1 and 35, depending on the type of working fluid used and the target round-trip efficiency of TESS 1100. In some embodiments, expander 1110 may be an axial expander, a radial expander, may be a single-stage expander or multiple stages expander.

The working fluid may exit compressor 1102 and proceed to hot heat sink 1104. Hot heat sink 1104 may include a packed-bed thermal energy storage, which may be formed from solid storage media. During the discharging phase, heat transfer may occur in hot heat sink 1104 from hot temperature storage material to the working fluid. The working fluid (now at a higher temperature) may flow from hot heat sink 1104 to expander 1110. Expander 1100 may be configured to decrease the pressure of the working fluid, thereby decreasing the temperature of the working fluid through an adiabatic expansion process. Further, during discharging, the maximum amount of waste energy from expander 1160 may be stored in reservoir 1158 for use in the charging cycle.

Along the low temperature/low pressure side, reservoir 1108 may be positioned downstream of expander 1110. Heat rejection component 1120 may be positioned downstream of reservoir 1108. Compressor 1102 may be positioned downstream of heat rejection component 1120. The working fluid may exit expander 1110 (at a now lower pressure and lower temperature) and proceed to reservoir 1108. Reservoir 1108 may include a packed-bed thermal energy storage formed from solid storage media. During the discharging phase, working fluid may flow through reservoir 1108, and deliver its thermal energy to the storage media in reservoir 1108. The working fluid may proceed to ambient heat rejection component 1120. Ambient heat rejection component 1120 may be used, for example, as a means of system safety. From ambient heat rejection component 1120, working fluid may flow to compressor 1102. At an inlet of compressor 1102, the working fluid may be between about 0° C. and 30° C.

In operation, the working fluid may reach a maximum operating pressure of up to about 35 atm on the high pressure/high temperature side. The minimum operating pressure of the working fluid may be about 1 atm. On the high temperature/high pressure side, the working fluid may reach a temperature between about 700° C. and 1250° C.

FIG. 11B illustrates a charging schematic of TESS 1150, according to example embodiments. TESS 1150 may be similar to TESS 150 illustrated above in conjunction with FIG. 1B. TESS 1150 may include compressor 1152, hot heat sink 1154, bottoming cycle 1174, expander 1160, reservoir 1158, heat rejection component 1170, alternator 1166, and turbo train drive 1162.

TESS 1150 may include a high temperature/high pressure side (illustrated by a solid line) and a low temperature/low pressure side (illustrated by a dashed line). Along the high temperature/high pressure side, hot heat sink 1154 may be positioned downstream of compressor 1152. A working fluid may be input to compressor 1152. Exemplary working fluids may include, but are not limited to, Ar, $N_2$, $CO_2$, air, He, any He mixtures, any mixtures, and the like. Compressor 1152 may be configured to pressurize and heat working fluid input into TESS 1150 through an adiabatic compression process. In some embodiments, compressor 1152 may have a pressure ratio between about 1.1 and 35, depending on the type of working fluid used and the target round-trip efficiency of TESS 1150. In some embodiments, compressor 1152 may be an axial compressor, a radial compressor, or a combination axial-radial compressor. Compressor 1152 may have a polytropic efficiency between about 0.8 to about 0.95. The working fluid may exit compressor 1152 and proceed to hot heat sink 1154. In some embodiments, the highest operating temperature of the working fluid may occur between the exit of compressor 1152 and hot heat sink 1154. For example, the operating temperature of the working fluid may be between about 700° C. and 1250° C.

Hot heat sink 1154 may include a packed-bed thermal energy storage, which may be formed from solid storage media. During the charging phase, high temperature working fluid may flow through hot heat sink to deliver heat to the storage material in hot heat sink 1154. The working fluid (now at a lower temperature) may flow from hot heat sink 1154 to bottoming cycle 1174. Bottoming cycle 1174 may include, without being limited to, Rankine, Organic Rankine, or $SCO_2$. Bottoming cycle 1174 may be added to the cycle in order to utilize a maximum amount of waste thermal energy. The working fluid may flow from bottoming cycle 1174 to expander 1160. Expander 1160 may be configured to decrease the pressure of the working fluid, thereby decreasing the temperature of the working fluid through an adiabatic expansion process. Expander 1160 may be an axial expander, a radial expander, may be a single-stage expander, or a multiple stage expander. In some embodiments, expander 1160 may be a polytropic efficiency between about 0.8 to about 0.95.

Along the low temperature/low pressure side, reservoir 1158 may be positioned downstream of expander 1160. Heat rejection component 1170 may be positioned downstream of reservoir 1158. Compressor 1152 may be positioned downstream of heat rejection component 1170. The working fluid may exit expander 1160 (at a now lower pressure and lower temperature) and proceed to reservoir 1158. In some embodiments, the minimum operating temperature of the working fluid (e.g., may be much lower than 0° C.) may occur between expander 1160 and reservoir 1158. Reservoir 1158 may include a packed-bed thermal energy storage formed from solid storage media. Exemplary solid storage media may include pebbles, gravel, rocks, alumina oxide ceramic, cordierite honeycomb ceramic, dense cordierite honeycomb ceramic, and the like. Generally, reservoir 1158 may be insulated, such that reservoir 1158 does not lose more than about 15% of heat during about 24 hours of holding time. During the charging phase, a low temperature working fluid may flow through reservoir 1158, and is heated as it travels through. The working fluid (now at a higher temperature) may proceed to ambient heat rejection component 1170. Ambient heat rejection component 1170 may be used as a means of system safety. From ambient heat rejection component 1170, working fluid may flow to compressor 1152.

Based on the working fluid and the maximum operating temperature recited above, TESS 1100 and TESS 1150 may yield a round trip efficiency between about 0.5 and about 0.90. Accordingly, TESS 1100 and 1150 may be configured to provide power between about 0.1 MW and about 100 MW for up to about 10 hours of operation. Even though the above description is a closed loop cycle, in some embodiments, TESS 1100 and 1150 may utilize an auxiliary make up tank for working fluid at the minimum operating pressure level.

Figure 12:
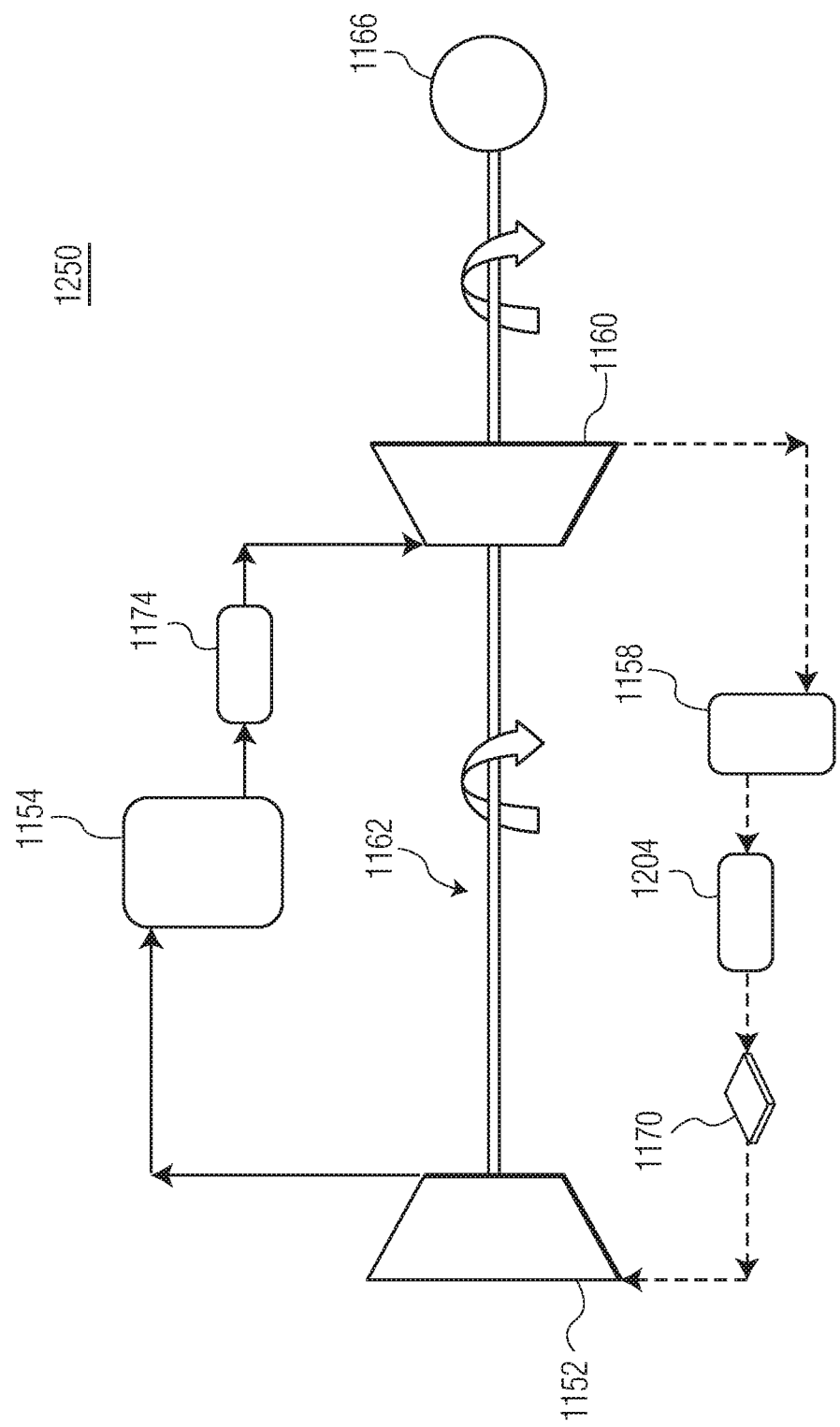
FIG. 12 illustrates a schematic of an example TESS, according to another embodiment.

FIG. 12 illustrates a charging schematic for TESS 1250, according to example embodiments. TESS 1250 may be similar to TESS 1150 illustrated above in conjunction with FIG. 11B. For example, FIG. 12 may illustrate a counterpart charging schematic for the discharging schematic illustrated in FIG. 11A. TESS 1250 may further include bottoming cycle 1204. Bottoming cycle 1204 may be added to the low temperature/low pressure side. For example, as illustrated, bottoming cycle 1204 may be positioned downstream of reservoir 1158 and upstream of heat rejection component 1170. Such configuration may improve round trip efficiency by increasing the maximum operating temperature of TESS 1250. Such bottoming cycle 1204 may improve overall round-trip efficiency. Bottoming cycle 1204 may include, without being limited to, Rankine, Organic Rankine, $SCO_2$, and the like.

Figure 13:
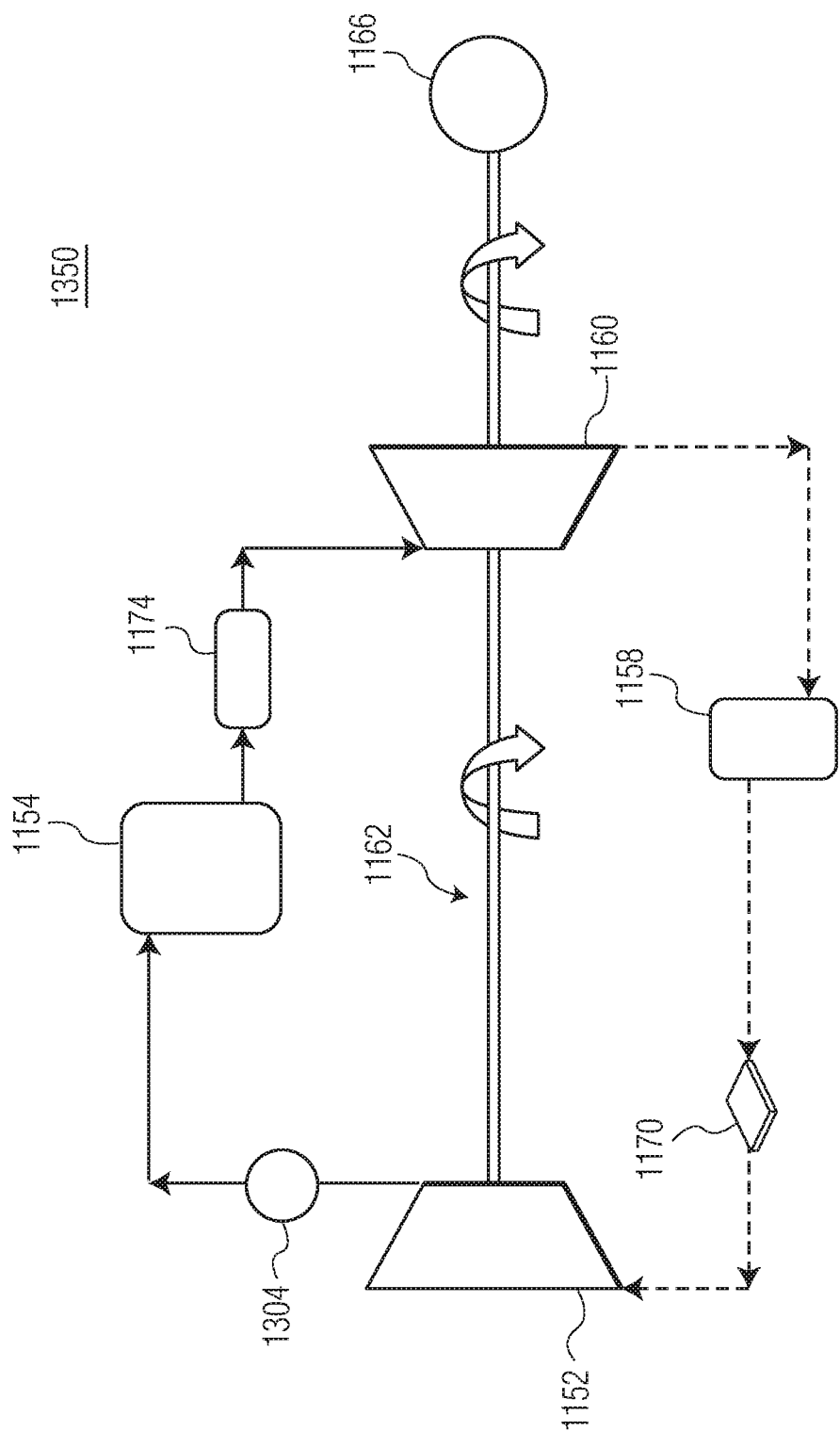
FIG. 13 illustrates a schematic of an example TESS, according to another embodiment.

FIG. 13 illustrates a charging schematic for TESS 1350, according to example embodiments. TESS 1350 may be similar to TESS 1150 illustrated above in conjunction with FIG. 11B. For example, FIG. 13 may illustrate a counterpart charging schematic for the discharging schematic illustrated in FIG. 11A. TESS 1350 may further include heat booster 1304. Heat booster 1304 may be added to the high temperature/high pressure side. For example, as illustrated, heat booster 1304 may be positioned downstream of compressor 1152 and upstream of hot heat sink 1154. Such configuration aids in increasing the maximum temperature of TESS 1350, which may directly increase the round-trip efficiency of TESS 1350 without increasing the pressure ratio of compressor 1152. As such, TESS 1350 may operate at the same maximum pressure level, but at a much higher temperature. This may also result in cost savings of compressor 1152 design.

Figure 14:
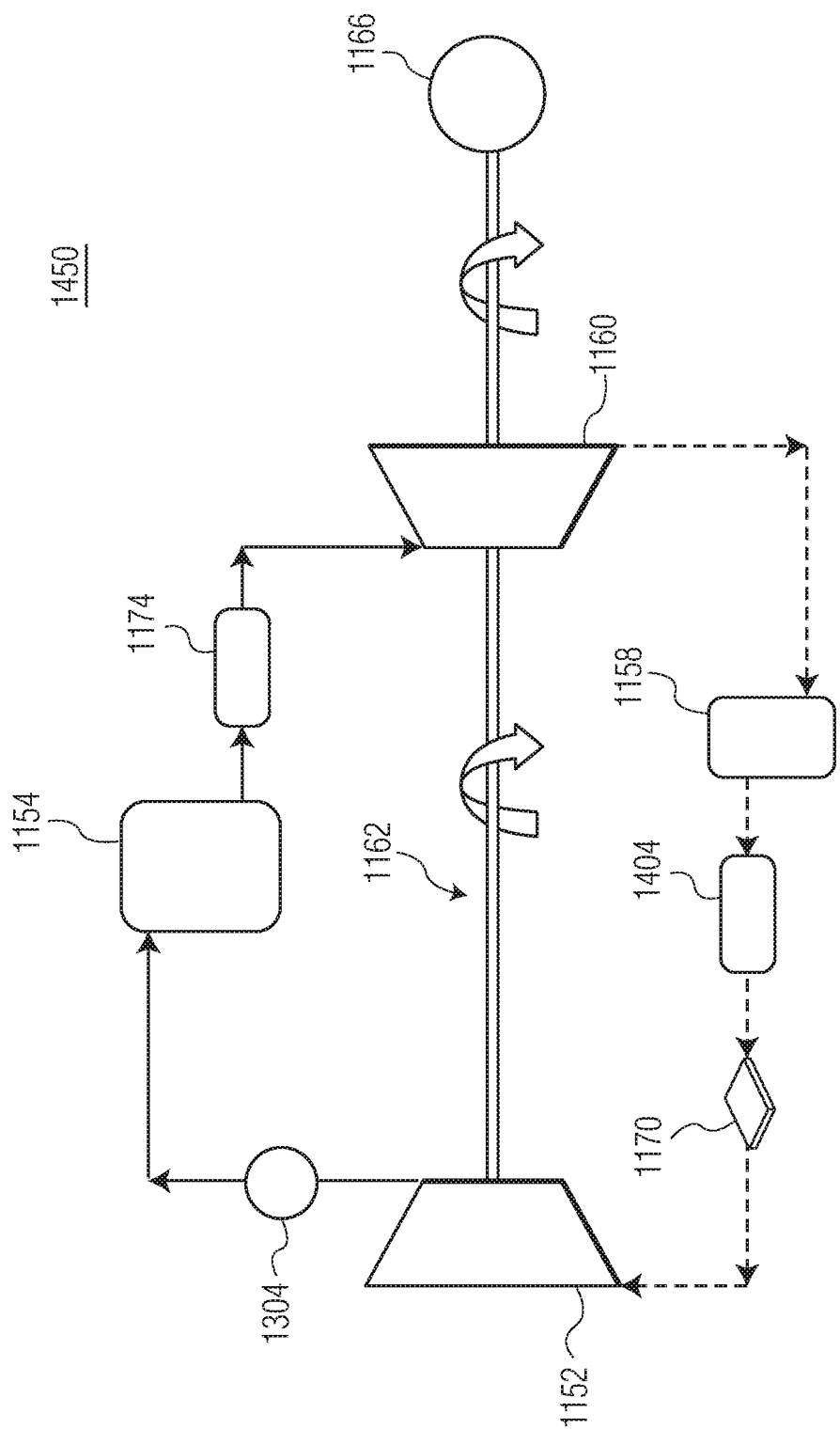
FIG. 14 illustrates a schematic of an example TESS, according to another embodiment.

FIG. 14 illustrates a charging schematic for TESS 1450, according to example embodiments. TESS 1450 may be similar to TESS 1350 illustrated above in conjunction with FIG. 13. For example, FIG. 14 may illustrate a counterpart charging schematic for the discharging schematic illustrated in FIG. 11A. TESS 1450 may further include bottoming cycle 1404. Bottoming cycle 1404 may be added to the low temperature/low pressure side. For example, as illustrated, bottoming cycle 1404 may be positioned downstream of reservoir 1158 and upstream of ambient heat rejection component 1170. Use of bottoming cycle 1404 with heat booster 1304 may aid in reducing the exit temperature of the working fluid from compressor 1152. Such configuration may also improve round trip efficiency by increasing the maximum operating temperature of TESS 1450 by, for example, storing a higher thermal energy during the charging phase. Bottoming cycle 1404 may include Rankine, Organic Rankine, $SCO_2$, and the like.

Figure 15:
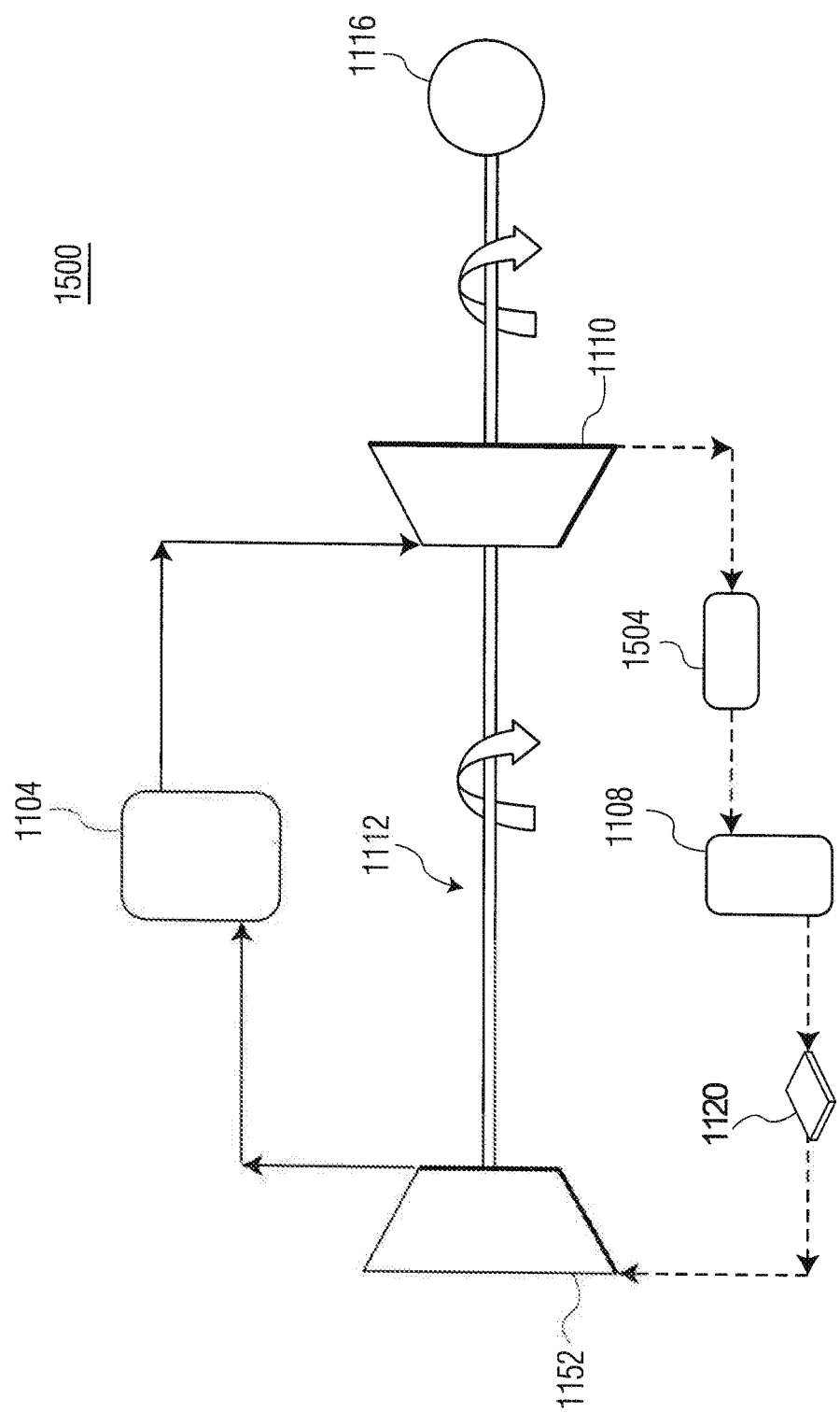
FIG. 15 illustrates a schematic of an example TESS, according to another embodiment.

FIG. 15 illustrates a discharging schematic for TESS 1500, according to example embodiments. TESS 1500 may be similar to TESS 1100 illustrated above in conjunction with FIG. 11A. TESS 1500 may further include bottoming cycle 1504. Bottoming cycle 1504 may be added to the low temperature/low pressure side. For example, as illustrated, bottoming cycle 1504 may be positioned downstream of expander 1110 and upstream of reservoir 1108. Such configuration may yield a working fluid temperature high enough to utilize a higher efficient bottoming cycle, such as SCO2, or a less efficient (but also least costly) simple steam generator (e.g., Rankine Cycle).

FIG. 16 illustrates a charging schematic for TESS 1650, according to example embodiments. TESS 1650 may be similar to TESS 1150 illustrated above in conjunction with FIG. 11B. FIG. 16 may illustrate a counterpart charging schematic for the discharging schematic illustrated in FIG. 15. TESS 1650 may further include heat booster 1604. Heat booster 1604 may be added to the high temperature/high pressure side. For example, as illustrated, heat booster 1604 may be positioned downstream of compressor 1152 and upstream of hot heat sink 1154. Such configuration aids in increasing the maximum temperature of TESS 1650, which may directly increase the round-trip efficiency of TESS 1650 without increasing the pressure ratio of compressor 1152. As such, TESS 1650 may operate at the same maximum pressure level, but at a much higher temperature. This may also result in cost savings of compressor 1152 design.

FIG. 17A illustrates a discharging schematic of TESS 1700, according to example embodiments. TESS 1700 may be similar to TESS 1100 illustrated above in conjunction with FIG. 11A. For example, TESS 1700 may include one or more components similar to TESS 1100. However, TESS 1700 does not utilize a cold storage unit (i.e., a reservoir). As illustrated, TESS 1700 may include compressor 1702, hot heat sink 1704, expander 1710, bottoming cycle 1724, heat rejection component 1720, alternator 1716, and turbo train drive 1712.

TESS 1700 may include a high temperature/high pressure side (illustrated by a solid line) and a low temperature/low pressure side (illustrated by a dashed line). Along the high temperature/high pressure side, hot heat sink 1704 may be positioned downstream of compressor 1702. Compressor 1102 may be configured to pressurize and heat working fluid input into TESS 1700 through an adiabatic compression process. In some embodiments, compressor 1702 may have a pressure ratio between about 1.1 and 35, depending on the type of working fluid used and the target round-trip efficiency of TESS 1700. In some embodiments, compressor 1702 may be an axial compressor, a radial compressor, or a combination axial-radial compressor.

The working fluid may exit compressor 1702 and proceed to hot heat sink 1704. Hot heat sink 1704 may include a packed-bed thermal energy storage, which may be formed from solid storage media. During the discharging phase, heat transfer may occur in hot heat sink 1704 from hot temperature storage material to the working fluid. The working fluid (now at a higher temperature) may flow from hot heat sink 1704 to expander 1710. Expander 1710 may be configured to decrease the pressure of the working fluid, thereby decreasing the temperature of the working fluid through an adiabatic expansion process.

Along the low temperature/low pressure side, bottoming cycle 1724 may be positioned downstream of expander 1710. Heat rejection component 1720 may be positioned downstream of expander 1710. Compressor 1702 may be positioned downstream of heat rejection component 1720. The working fluid may exit expander 1710 (at a now lower pressure and lower temperature) and proceed to bottoming cycle 1724. Such bottoming cycle 1724 may improve overall round-trip efficiency. Bottoming cycle 1724 may include Rankine, Organic Rankine, $SCO_2$, and the like. The working fluid may proceed to ambient heat rejection component 1720. Ambient heat rejection component 1720 may be used as a means of system safety. From ambient heat rejection component 1720, working fluid may flow to compressor 1702. At an inlet of compressor 1702, the working fluid may be between about 0° C. and 30° C.

In operation, the working fluid may reach a maximum operating pressure of up to about 35 atm on the high pressure/high temperature side. The minimum operating pressure of the working fluid may be about 1 atm. On the high temperature/high pressure side, the working fluid may reach a temperature between about 700° C. and 1250° C.

FIG. 17B illustrates a charging schematic of TESS 1750, according to example embodiments. TESS 1750 may be similar to TESS 1150 illustrated above in conjunction with FIG. 11B. For example, TESS 1750 may include one or more components similar to TESS 1150. However, TESS 1750 does not utilize a reservoir. TESS 1750 may include compressor 1752, hot heat sink 1754 expander 1760, heat booster 1758, heat rejection component 1770, alternator 1766, and turbo train drive 1762.

TESS 1750 may include a high temperature/high pressure side (illustrated by a solid line) and a low temperature/low pressure side (illustrated by a dashed line). Along the high temperature/high pressure side, hot heat sink 1754 may be positioned downstream of compressor 1752. A working fluid may be input to compressor 1752. Exemplary working fluids may include, but are not limited to, Ar, $N_2$, $CO_2$, air, He, He mixtures, and the like. Compressor 1752 may be configured to pressurize and heat working fluid input into TESS 1750 through an adiabatic compression process. In some embodiments, compressor 1752 may have a pressure ratio between about 1.1 and 35, depending on the type of working fluid used and the target round-trip efficiency of TESS 1750. In some embodiments, compressor 1752 may be an axial compressor, a radial compressor, or a combination axial-radial compressor. Compressor 1752 may have a polytropic efficiency between about 0.8 to about 0.95. Compressor 1752 may be a single stage or multiple stages compressor. The working fluid may exit compressor 1752 and proceed to hot heat sink 1754. In some embodiments, the highest operating temperature of the working fluid may occur between the exit of compressor 1752 and hot heat sink 1754. For example, the operating temperature of the working fluid may be between about 700° C. and 1250° C.

Hot heat sink 1754 may include a packed-bed thermal energy storage, which may be formed from solid storage media. During the charging phase, high temperature working fluid may flow through hot heat sink to deliver heat to the storage material in hot heat sink 1754. The working fluid (now at a lower temperature) may flow from hot heat sink 1754 to expander 1760. Expander 1760 may be configured to decrease the pressure of the working fluid, thereby decreasing the temperature of the working fluid through an adiabatic expansion process. Expander 1760 may be an axial expander, a radial expander, may be a single-stage expander, or a multiple stage expander. In some embodiments, expander 1760 may be a polytropic efficiency between about 0.8 to about 0.95.

Along the low temperature/low pressure side, heat booster 1758 may be positioned downstream of expander 1760. Heat rejection component 1770 may be positioned downstream of heat booster 1758. Compressor 1752 may be positioned downstream of heat rejection component 1770. The working fluid may exit expander 1760 (at a now lower pressure and lower temperature) and proceed to heat booster 1758. Heat booster 1758 may be configured to preheat the working fluid before entering compressor 1752. The working fluid (now at a higher temperature) may proceed to ambient heat rejection component 1770. Ambient heat rejection component 1770 may be used as a means of system safety. From ambient heat rejection component 1770, working fluid may flow to compressor 1752.

Figure 18:
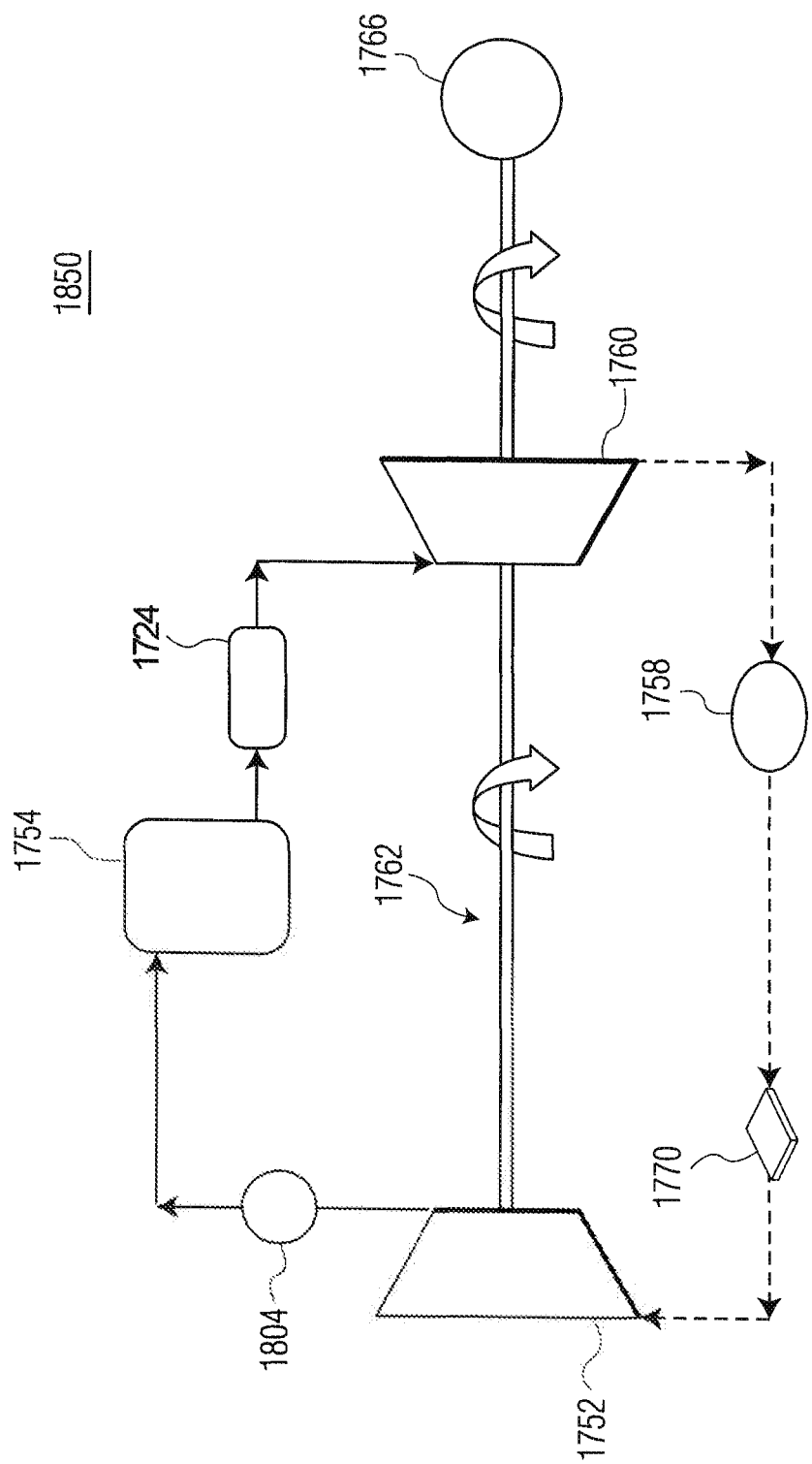
FIG. 18 illustrates a schematic of an example TESS, according to another embodiment.

FIG. 18 illustrates a charging schematic for TESS 1850, according to example embodiments. TESS 1850 may be similar to TESS 1750 illustrated above in conjunction with FIG. 17B. FIG. 18 may illustrate a counterpart charging schematic for the discharging schematic illustrated in FIG. 17A. TESS 1850 may further include heat booster 1804. Heat booster 1804 may be added to the high temperature/high pressure side. For example, as illustrated, heat booster 1804 may be positioned downstream of compressor 1752 and upstream of hot heat sink 1754. Such configuration aids in increasing the maximum temperature of TESS 1850, which may directly increase the round-trip efficiency of TESS 1850 without increasing the pressure ratio of compressor 1752. As such, TESS 1850 may operate at the same maximum pressure level, but at a much higher temperature. This may also result in cost savings of a design of compressor 1752.

Figure 19:
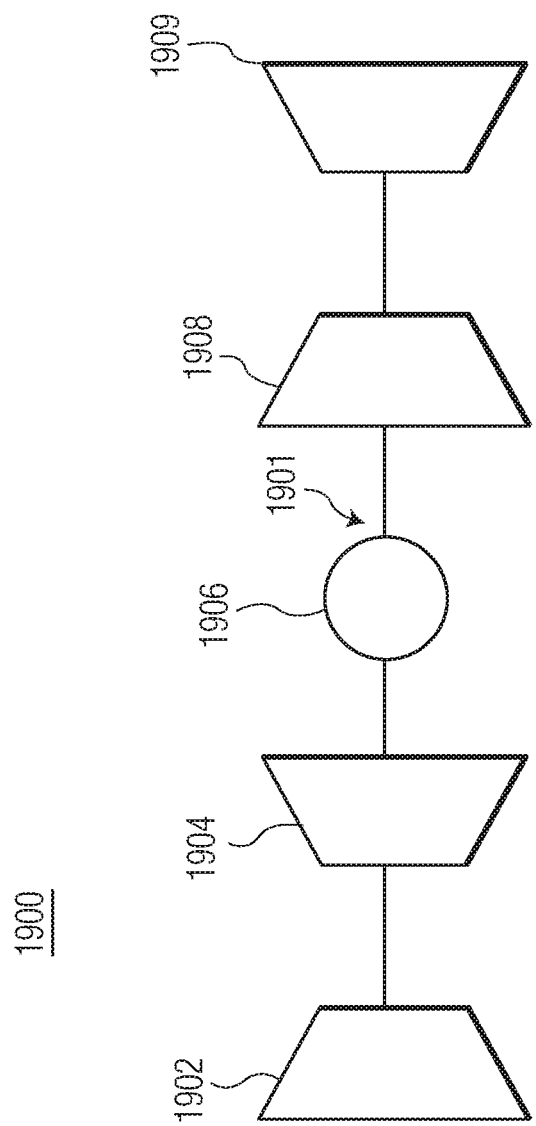
FIG. 19 illustrates a schematic of an example TESS, according to another embodiment.

FIG. 19 illustrates a schematic of TESS 1900 for thermal energy generation, storage, charging and discharging, according to one embodiment. TESS 1900 may include compressor 1902, expander 1904, alternator 1906, compressor 1908, and expander 1909, all joined by single turbo train drive shaft 1901. In the embodiment in FIG. 19, single turbo train drive shaft 1901 is a dual purpose turbo train drive that performs both charging and discharging functions.

Figure 20:
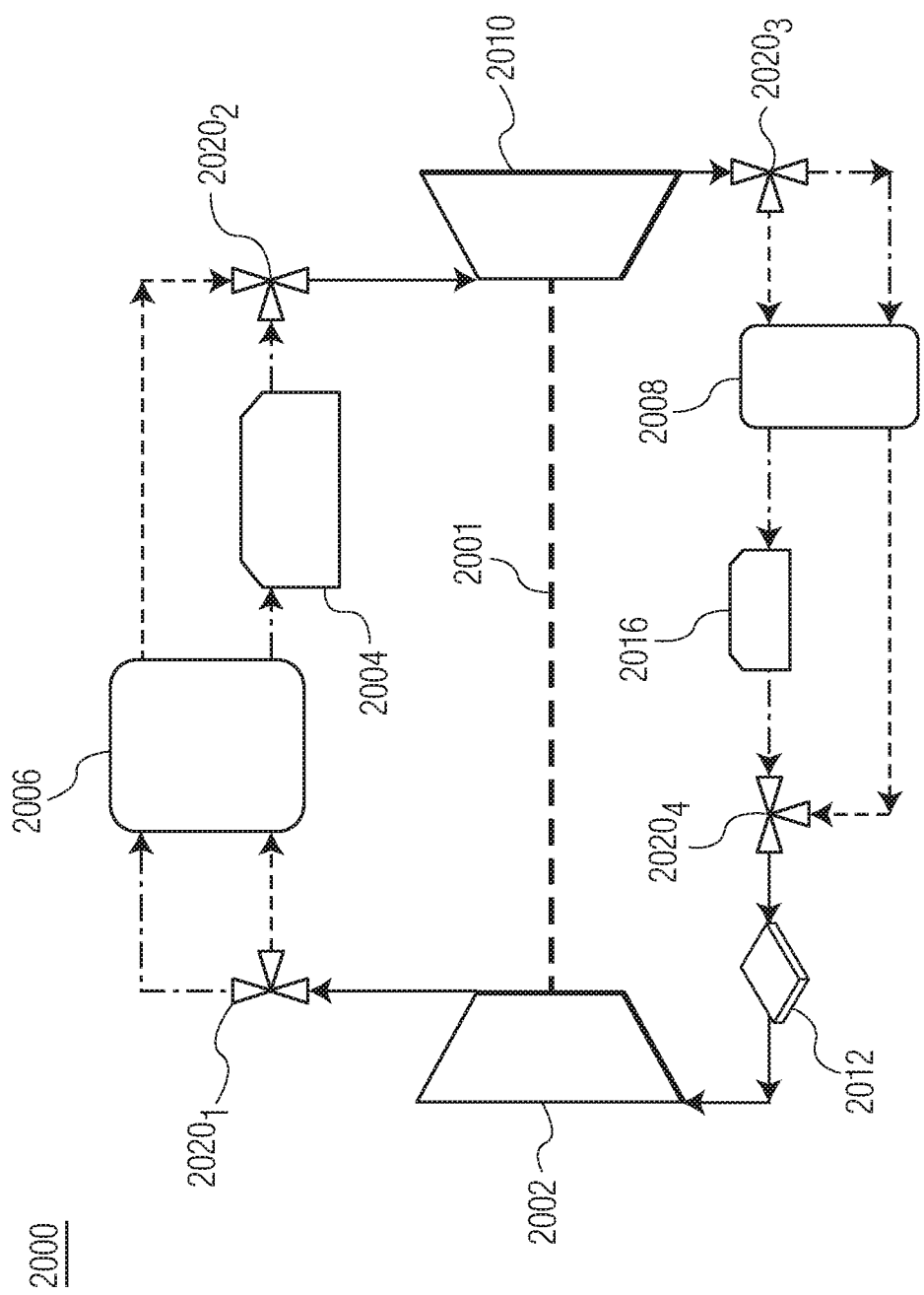
FIG. 20 illustrates a schematic of an example TESS, according to another embodiment.

FIG. 20 illustrates a schematic of TESS 2000 for thermal energy generation, storage, charging, and discharging, according to example embodiments. TESS 2000 may include compressor 2002, bottoming cycle 2004, high heat sink 2006, expander 2010, heat rejection component 2012, reservoir 2008, another bottoming cycle 2016, single turbo train drive 2001, and one or more valves $2020_1$-$2020_4$ (generally "valve 2020"). Further, in some embodiments, even though not shown, TESS 2000 may include a shaft connect compressor, expander, and alternator.

Turbo train drive 2001 may be a dual purpose turbo train drive that performs both charging and discharging functions. For example, TESS 2000 may utilize the same compressor (i.e., compressor 2002) and the same expander (i.e., expander 2010) for charging and discharging phases. This is because TESS 2000 may not perform charging operations and discharging operations at the same time. Flow direction through TESS 2000 may be controlled by one or more valves 2020. For example, first valve $2020_1$ may be positioned between compressor 2002 and hot heat sink 2006; second valve $2020_2$ may be positioned a junction between hot heat sink 2006, bottoming cycle 2004, and expander 2010; third valve $2020_3$ may be positioned between expander 2010 and reservoir 2008; and fourth valve $2020_4$ may be positioned at a junction between reservoir 2008, bottoming cycle 2016, and heat rejection component 2012. As illustrated, there are two paths through TESS 2000. A first path (represented by a dotted line) illustrates a charging phase path. A second path (represented by a dashed line) illustrates a discharging phase. A third path (represented by the solid line) illustrates a common path for both the charging and discharging phases.

Following along the charging phase path, a working fluid may be input to compressor 2002. Exemplary working fluids may include, but are not limited to, Ar, $N_2$, $CO_2$, air, helium mixtures, and the like. Compressor 2002 may be configured to pressurize and heat working fluid input into TESS 2000 through an adiabatic compression process. Hot heat sink 2006 may be positioned downstream of compressor 2002. Hot heat sink 2006 may include a packed-bed thermal energy storage, which may be formed from solid storage media. During the charging phase, high temperature working fluid may flow through hot heat sink to deliver heat to the storage material in hot heat sink 2006. Working fluid may go from hot heat sink 2006 to expander 2010 positioned downstream of hot heat sink 2006, after passing through bottoming cycle 2004. Bottoming cycle 2004 may be used to improve overall round-trip efficiency. Bottoming cycle 2004 may include Rankine, Organic Rankine, $SCO_2$, and the like. Expander 2006 may be configured to decrease the pressure of the working fluid, thereby decreasing the temperature of the working fluid through an adiabatic expansion process. Expander 2006 may be an axial expander, a radial expander, may be a single-stage expander, or a multiple stage expander. The working fluid may exit expander 2006 and proceed to reservoir 2008.

Reservoir 2008 may include a packed-bed thermal energy storage formed from solid storage media. Exemplary solid storage media may include pebbles, gravel, rocks, alumina oxide ceramic, cordierite honeycomb ceramic, dense cordierite honeycomb ceramic, and the like. During the charging phase, a lower temperature working fluid may flow through reservoir 2008, and is heated as it travels through. The working fluid (now at a higher temperature) may proceed to bottoming cycle 2016. Bottoming cycle 2016 may be used to improve overall round-trip efficiency. Bottoming cycle 2016 may include Rankine, Organic Rankine, $SCO_2$, and the like. From bottoming cycle 2016, the working fluid may proceed to heat rejection component 2012. Heat rejection component 2012 is configured to protect TESS 2000 during processing. The working fluid may then be returned to compressor 2002.

Following along the discharging phase path, working fluid may exit compressor 2002 and proceed to hot heat sink 2006. From hot heat sink 2006, the working fluid may proceed to expander 2010. Expander 2010 may be configured to decrease the pressure of the working fluid, thereby decreasing the temperature of the working fluid through an adiabatic expansion process. The working fluid may then proceed from expander 2010 to reservoir 2008. During the discharging phase, working fluid (at an initial temperature) may flow through reservoir 2008 and proceed to compressor 2002, while passing through heat rejection component 2012.

Figure 21:
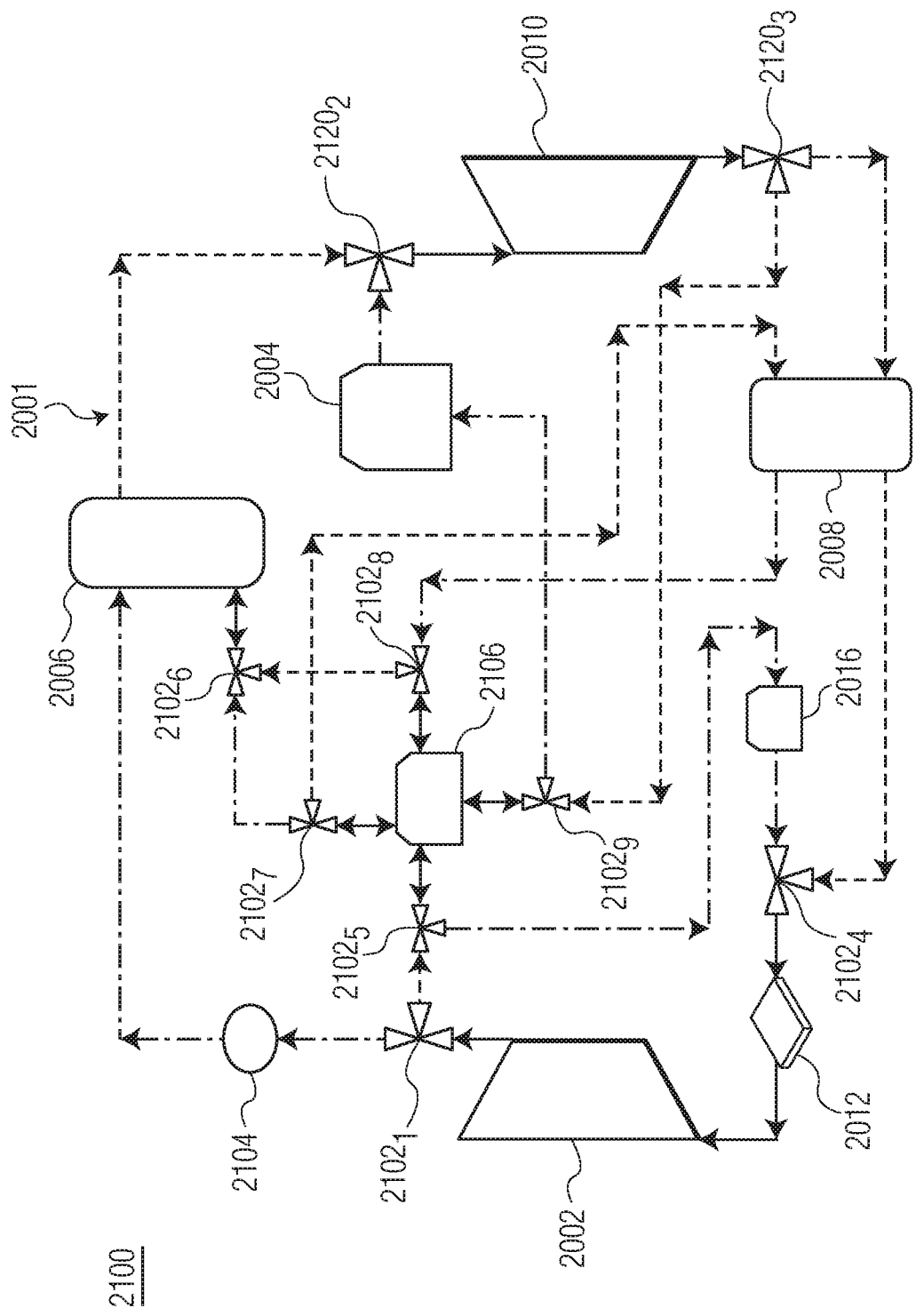
FIG. 21 illustrates a schematic of an example TESS, according to another embodiment.

FIG. 21 illustrates a schematic of TESS 2100 for thermal energy generation, storage, charging, and discharging, according to example embodiments. TESS 2100 may be similar to TESS 2000 discussed above in conjunction with FIG. 20. TESS 2100 may further include heat booster 2104, recuperator 2106, and one or more valves $2102_1$-$2102_9$.

As illustrated, there are two paths through TESS 2100. A first path (represented by a dotted line) illustrates a charging phase path. A second path (represented by a dashed line) illustrates a discharging phase. A third path (represented by the solid line) illustrates a common path for both the charging and discharging phases.

Following along the charging phase path, a working fluid may flow from compressor 2002 to heat booster 2104 via valve $2102_1$. Heat booster 2104 may be configured to raise a temperature of the working fluid received from compressor 2002. The working fluid may flow from heat booster 2104 to hot heat sink 2006. From hot heat sink 2006, the working fluid may flow to recuperator 2106 via valve $2102_6$ and valve $2102_7$. From recuperator 2106, the working fluid may flow to bottoming cycle 2004 via valve $2102_9$. The working fluid may then proceed from bottoming cycle 2004 to expander 2010 via valve $2102_2$. From expander 2010, the working fluid may proceed to reservoir 2008 via valve 21023. The working fluid may then proceed back to recuperator 2106 via valve $2102_8$. The working fluid may then proceed from recuperator 2106 to bottoming cycle 2016 via valve $2102_5$. From bottoming cycle 2016, the working fluid may proceed to heat rejection component 2012 via valve 21024. Accordingly, the working fluid returns back to compressor 2002 via heat rejection components 2012.

Following along the discharging phase path, the working fluid may flow from compressor 2002 to recuperator 2106 via valve $2102_5$. From recuperator 2106, the working fluid may proceed to hot heat sink 2006 via valves 20126 and 20128. From hot heat sink 2006, the working fluid may proceed to expander 2010 via valve $2102_2$. The working fluid may then proceed from expander 2010 back to recuperator 2106 via valve $2102_9$. From recuperator 2106, the working fluid may flow to reservoir 2008 via valve $2102_7$. From reservoir 2008, the working fluid may proceed to heat rejection component 2012 via valve 21024. The working fluid may then return to compressor 2002.

Generally, each TESS described above may aid in improving power generation, for example, by smoothing power delivery from renewable generation and providing an option to defer grid distribution cost by offering a distributed power option for congested regions and behind the meter applications. The configuration of each TESS may provide a high level of reliability and cost efficiency that may allow use of the system in a wide range of utility and industrial applications. Further advancements in turbo machinery cycle and heat sink materials also have the potential to further improve the overall efficiency and deliver added cost effectiveness. Standard operation practices currently exist to deploy and operate TESS 100 for daily cycling over a long lifespan (e.g., about a 25 year system lifespan).

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present invention.

The invention claimed is:

1. An energy storage system, comprising:
a turbo train drive in mechanical communication with a compressor and an expander;
a hot heat sink in thermal communication between an output of the compressor and an input of the expander;
a reservoir in thermal communication between an output of the expander and an input of the compressor;

a first bottoming cycle positioned between an output of the hot heat sink and the input of the expander; and
a second bottoming cycle positioned between an output of the reservoir and the input of the compressor,
wherein the compressor and the expander, via the turbo train drive, are operable between a charging function for charging the hot heat sink and a discharging function for discharging the hot heat sink.

2. The energy storage system of claim 1, wherein:
the compressor, the hot heat sink, and the expander define a higher pressure flow path, and
the expander, the reservoir and the compressor define a lower pressure flow path.

3. The energy storage system of claim 2, wherein the hot heat sink is positioned downstream of the compressor and upstream of the expander.

4. The energy storage system of claim 1, wherein:
the compressor, the hot heat sink, and the expander define a higher temperature flow path, and
the expander, the reservoir, and the compressor define a lower temperature flow path.

5. The energy storage system of claim 4, wherein the reservoir is positioned downstream of the expander and upstream of the compressor.

6. The energy storage system of claim 1, further comprising:
a heat booster positioned between the output of the compressor and an input of the hot heat sink.

7. The energy storage system of claim 1, further comprising:
a heat rejection component positioned between an output of the reservoir and the input of the compressor.

8. An energy storage system, comprising:
a turbo train drive in mechanical communication with a compressor and an expander;
a hot heat sink in thermal communication between an output of the compressor and an input of the expander; and
a recuperator in thermal communication between an output of the expander and an input of the compressor,
wherein:
the compressor and the expander, via the turbo train drive, are operable between a charging function for charging the hot heat sink and a discharging function for discharging the hot heat sink,
the compressor, the recuperator, the hot heat sink, and the expander define a higher temperature flow path, and
the expander, the recuperator, and the compressor define a lower temperature flow path.

9. The energy storage system of claim 8, wherein:
the compressor, the recuperator, the hot heat sink, and the expander define a higher pressure flow path, and
the expander, the recuperator, and the compressor define a lower pressure flow path.

10. The energy storage system of claim 8, wherein the hot heat sink is in communication with an input of the recuperator and the output of the compressor, and the recuperator is in communication with an output of the hot heat sink and the input of the expander during the charging function.

11. The energy storage system of claim 10, further comprising:
a heat booster positioned between the output of the compressor and an input of the hot heat sink.

12. The energy storage system of claim 11, wherein the recuperator is positioned between an output of the expander and an input of the compressor.

13. The energy storage system of claim 8, further comprising:
a heat booster positioned between the output of the expander and an input of the recuperator.

14. The energy storage system of claim 8, wherein the turbo train drive comprises a single turbo train drive.

15. The energy storage system of claim 8, wherein the recuperator is positioned between the output of the compressor and an input of the hot heat sink, and the hot heat sink is positioned between an output of the recuperator and the input of the expander during the discharging function.

16. The energy storage system of claim 8, further comprising a reservoir in thermal communication between an output of the expander and an input of the compressor.

17. The energy storage system of claim 8, further comprising a bottoming cycle in thermal communication between an output of the expander and an input of the compressor.

18. The energy storage system of claim 14, further comprising:
an interface in communication with the single turbo drive train, the interface configured for receiving a selection of an operation mode comprising one of the charging function and the discharging function.

19. An energy storage system, comprising:
a turbo train drive in mechanical communication with a compressor and an expander;
a hot heat sink in thermal communication between an output of the compressor and an input of the expander;
a bottoming cycle in thermal communication between an output of the hot heat sink and the input of the expander; and
a heat booster in thermal communication between an output of the expander and an input of the compressor;
wherein:
the compressor and the expander, via the turbo train drive, are operable between a charging function for charging the hot heat sink and a discharging function for discharging the hot heat sink,
each of the hot heat sink, the bottoming cycle, the heat booster, the compressor and the expander are in direct thermal contact with a same working fluid within a closed loop,
said working fluid passing through a heating medium in the hot heat sink, and
the bottoming cycle is dedicated to the charging function.

20. The energy storage system of claim 19, wherein:
the compressor, the hot heat sink, the bottoming cycle, and the expander define a higher temperature flow path, and
the expander, the heat booster, and the compressor define a lower temperature flow path.

21. The energy storage system of claim 19, wherein:
the compressor, the hot heat sink, the bottoming cycle, and the expander define a higher pressure flow path, and
the expander, the heat booster, and the compressor define a lower pressure flow path.

22. The energy storage system of claim 19, further comprising:
a reservoir operable to transfer excess thermal energy from the discharging function to the charging function.

23. An energy storage system, comprising:
a turbo train drive in mechanical communication with a compressor and an expander;
a hot heat sink in thermal communication between an output of the compressor and an input of the expander;

a recuperator in thermal communication and positioned between an output of the expander and an input of the compressor;

a bottoming cycle positioned between an output of the recuperator and the input of the compressor; and a heat booster positioned between the output of the compressor and an input of the hot heat sink, wherein:

the compressor and the expander, via the turbo train drive, are operable between a charging function for charging the hot heat sink and a discharging function for discharging the hot heat sink, and the hot heat sink is in communication with an input of the recuperator and the output of the compressor, and the recuperator is in communication with an output of the hot heat sink and the input of the expander during the charging function.

24. An energy storage system, comprising:

a turbo train drive in mechanical communication with a compressor and an expander;

a hot heat sink in thermal communication between an output of the compressor and an input of the expander;

a bottoming cycle in thermal communication between an output of the hot heat sink and the input of the expander; and a heat booster in thermal communication between an output of the expander and an input of the compressor;

wherein:

the compressor and the expander, via the turbo train drive, are operable between a charging function for charging the hot heat sink and a discharging function for discharging the hot heat sink, the compressor, the hot heat sink, the bottoming cycle, and the expander define a higher temperature flow path, and the expander, the heat booster, and the compressor define a lower temperature flow path.

25. An energy storage system, comprising:

a turbo train drive in mechanical communication with a compressor and an expander;

a hot heat sink in thermal communication between an output of the compressor and an input of the expander;

a bottoming cycle in thermal communication between an output of the hot heat sink and the input of the expander; and a heat booster in thermal communication between an output of the expander and an input of the compressor;

wherein:

the compressor and the expander, via the turbo train drive, are operable between a charging function for charging the hot heat sink and a discharging function for discharging the hot heat sink, the compressor, the hot heat sink, the bottoming cycle, and the expander define a higher pressure flow path, and the expander, the heat booster, and the compressor define a lower pressure flow path.

26. An energy storage system, comprising:

a turbo train drive in mechanical communication with a compressor and an expander, the compressor configured to compress a working fluid, the expander configured to expand said working fluid;

a hot heat sink in direct thermal contact with said working fluid between an output of the compressor and an input of the expander;

a recuperator in direct thermal contact with said working fluid between an output of the expander and an input of the compressor, and a reservoir in direct thermal contact with said working fluid, wherein:

the compressor and the expander, via the turbo train drive, are operable between a charging function for charging the hot heat sink and a discharging function for discharging the hot heat sink, the compressor, the recuperator, the hot heat sink, and the expander define a higher pressure and higher thermal energy flow path, and the expander, the recuperator, the reservoir, and the compressor define a lower pressure and lower thermal energy flow path.

* * * * *